United States Patent [19]
Genda et al.

[11] Patent Number: 5,509,008
[45] Date of Patent: Apr. 16, 1996

[54] HIGH SPEED ATM SWITCH WITH SIMPLIFIED ARBITRATION SCHEME AND CIRCUIT CONFIGURATION

[75] Inventors: Kouichi Genda; Naoaki Yamanaka, both of Tokyo, Japan

[73] Assignee: Nippon Telegraph & Telephone Corp., Tokyo, Japan

[21] Appl. No.: 205,886

[22] Filed: Mar. 3, 1994

[30] Foreign Application Priority Data

Mar. 3, 1993 [JP] Japan .................... 5-043036

[51] Int. Cl.$^6$ .................................... H04L 12/56
[52] U.S. Cl. .................... 370/60.10; 370/94.10
[58] Field of Search .................... 370/94.1, 60, 60.1, 370/85.6, 94.2, 61; 340/825.79, 825.8, 825.5, 825.51; 359/128, 139, 118

[56] References Cited

U.S. PATENT DOCUMENTS 5,311,345  5/1994  Cloonan et al. .................... 370/60

Primary Examiner—Douglas W. Olms
Assistant Examiner—Dang Ton
Attorney, Agent, or Firm—Banner & Allegretti, Ltd.

[57] ABSTRACT

An ATM switch in which the throughput is improved by the simplified arbitration scheme and circuit configuration. This ATM switch uses a matrix type switch formed by N input lines for transmitting the cells read out from the input buffers, M output lines for transmitting the cells to be written into the output buffers, and N×M crosspoints located at intersections of the input lines and the output lines, where each crosspoint at an intersection of one input line and one output line carries out an arbitration operation in which a cell arriving from an upper stream side of that one output line is passed to a lower stream side of that one output line with a higher priority than a cell arriving from that one input line, and tile cell arriving from that one input line is transferred to the lower stream side of that one output line only when there is no cell arriving from the upper stream side of that one output line.

22 Claims, 24 Drawing Sheets

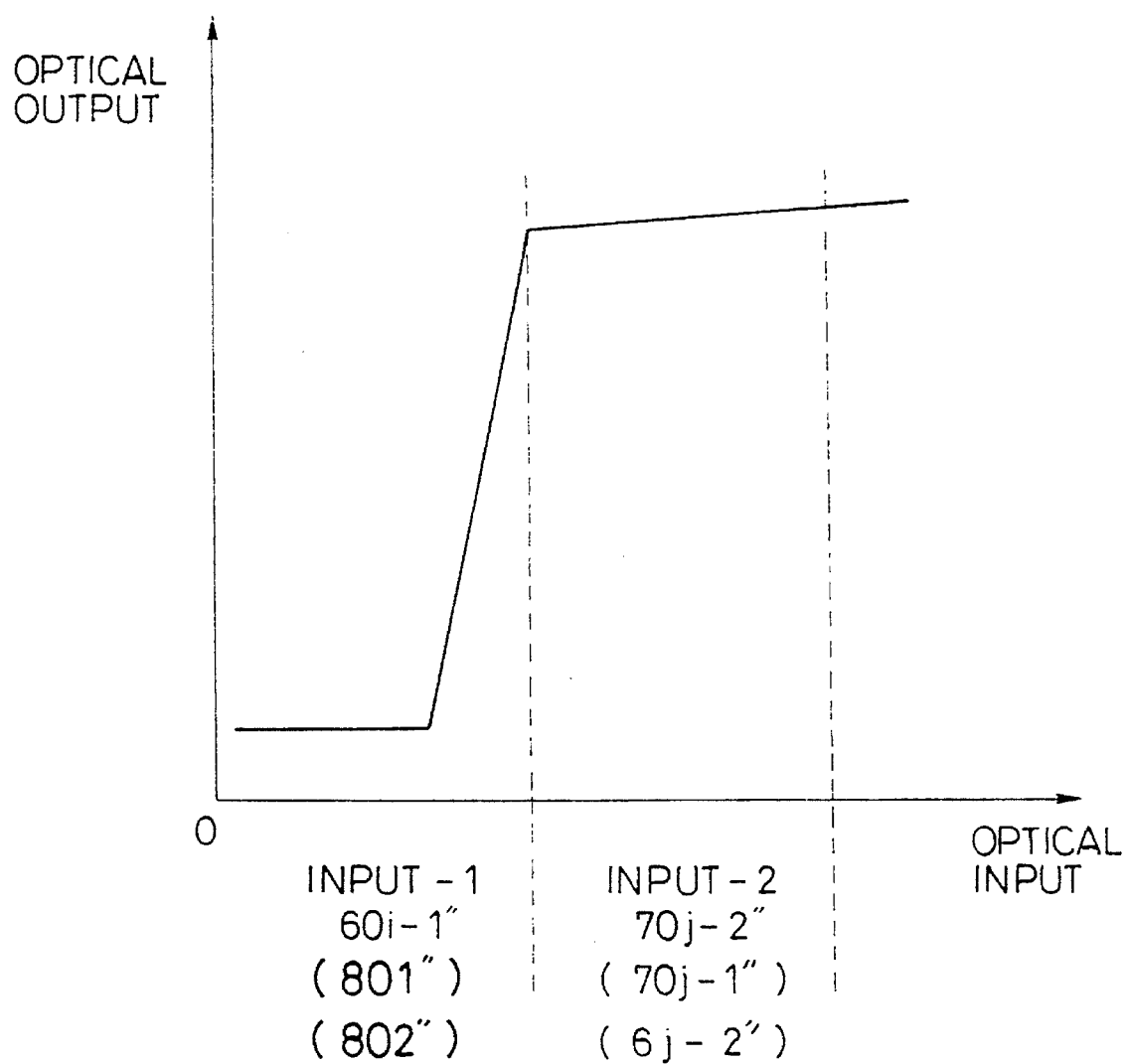

5,509,008

HIGH SPEED ATM SWITCH WITH SIMPLIFIED ARBITRATION SCHEME AND CIRCUIT CONFIGURATION

BACKGROUND OF THE INVENTION

1. Field of the Invention

The present invention relates to an ATM (Asynchronous Transfer Mode) switch to be used in an ATM communication network.

2. Description of the Background Art

The ATM is a well known high speed and wide bandwidth data transfer scheme in which the data are transferred in units of cells (or packets) through a network formed by transmission paths connected by ATM switches. Here, the ATM switch is a broadband ISDN communication switching device which receives each cell arriving from the input transmission line, judges the destination of each cell from its header data, and outputs each cell to an appropriate output transmission line according to the judged destination of that cell.

A conventional ATM switch has an exemplary configuration as shown in FIG. 1, in which cells arriving from input transmission lines 1101–1104 (in a case a number of input transmission lines N=4) are temporarily stored in input buffers 1301–1304, and then read out to input lines 1601–1604 of a matrix type switch 1500 formed by a plurality of crosspoints 1511–1544. Each of these crosspoints 1511–1544 of the matrix type switch 1500 is controlled by a control circuit 1050 according to the output destination data contained in the header of each cell temporarily stored in one of the input buffers 1301–1304, such that each cell read out to one of the input lines 1601–1604 is transferred appropriately by connecting said one of the input lines 1601–1604 with an appropriate one of output lines 1701–1704 of the matrix type switch 1500 at the appropriate one of the crosspoints 1511–1544. The cells transferred to the output lines 701–704 are temporarily stored in output buffers 1401–1404, and then outputted to output transmission lines 1201–1204 at respective data speeds of the output transmission lines 1201–1204.

In this conventional ATM switch of FIG. 1, the writing speed (or cell period T) at the input buffers 1301–1304 is equal to the data speed of the input transmission lines 1101–1104, and each cell is read out from each of the input buffers 1301–1304 to the matrix type switch 1500 at the speed (or internal period t) which is m times the writing speed (or cell period T) at the input buffers 1301–1304, where $1 < m \leq N$, according to the clock signals generated by a clock signal generator 1025.

When the cell read out from the input buffer 1301 reaches to the output buffer 1404 via a route as indicated by a thick solid line in FIG. 1, for example, an acknowledge signal (ACK) is returned from this output buffer 1404 to the input buffer 1301 via the same route as the cell is transferred but in a backward direction through the acknowledge signal line 1061 as indicated by a dashed line in FIG. 1. When this acknowledge signal (ACK) is received, the input buffer 1301 stops the reading of this cell.

Here, the operation in this conventional ATM switch of FIG. 1 is carried out according to the timing chart of FIG. 2 as follows. Namely, the internal period t of the ATM switch is a period which is one m-th of the cell period T at the input buffer, and it is necessary in this ATM switch to transfer the cell from the input buffer to the output buffer and return the acknowledge signal (ACK) from that output buffer to that input buffer, both within this internal period t, in order to realize the effective arbitration. This type of the arbitration has been discloses in Japanese Patent Application Laid Open No. 1- 309546 (1989).

Consequently, in the conventional ATM switch, an idle time tg is necessary after the completion of the cell transfer for the purpose of this arbitration, and this idle time tg can be unignorably long when the cell transfer speed is high.

In this regard, an ATM switch using a distributed arbitration algorithm to reduce the idle time tg has been proposed in Japanese Patent Application Laid Open No. 4- 2011 (1992). In this proposition, each crosspoint has its own arbitration circuit for avoiding the conflict among cells to be outputted to the same output line. However, since there is a need for each crosspoint to negotiate the output priority with all the crosspoints connected to the same output line, a faster arbitration algorithm becomes necessary when the switch operation speed is to be further increased in order to increase the cell transmission speed. To this end, in this proposition, the acknowledge signal is returned to the input buffer from each crosspoint such that the arbitration time can be reduced compared with the aforementioned Japanese Patent Application Laid Open No, 1- 309546.

However, there remains an unsolved problem concerning the further improvement of the throughput by devising simplified arbitration scheme and circuit configuration at low cost, such that the arbitration time and the blocking probability can be reduced without requiring an increase of the switch operation speed.

SUMMARY OF THE INVENTION

It is therefore an object of the present invention to provide an ATM switch capable of improving the throughput by the simplified arbitration scheme and circuit configuration at low cost, such that the arbitration time and the blocking probability can be reduced without requiring an increase of the switch operation speed.

According to one aspect of the present invention there is provided an ATM switch for switching cells from N input transmission lines to M output transmission lines, where N and M are integers, comprising: N input buffers for temporarily storing cells arriving from input transmission lines; M output buffers for temporarily storing cells to be outputted to output transmission lines; and a matrix type switch formed by N input lines for transmitting the cells read out from the input buffers, M output lines for transmitting the cells to be written into the output buffers, and N×M crosspoints located at intersections of the input lines and the output lines, where each crosspoint at an intersection of one input line and one output line carries out an arbitration operation in which a cell arriving from an upper stream side of said one output line is passed to a lower stream side of said one output line with a higher priority than a cell arriving from said one input line, and the cell arriving from said one input line is transferred to the lower stream side of said one output line only when there is no cell arriving from the upper stream side of said one output line.

According to another aspect of the present invention there is provided a method of ATM switching operation for switching cells from N input transmission lines to M output transmission lines, where N and M are integers, comprising the steps of: forming a matrix type switch by N input lines for transmitting the cells read out from N input buffers for temporarily storing cells arriving from input transmission lines, M output lines for transmitting the cells to be written into M output buffers for temporarily storing cells to be outputted to output transmission lines, and N×M crosspoints located at intersections of the input lines and the output lines; and carrying out an arbitration operation at each crosspoint at an intersection of one input line and one output line, in which a cell arriving from an upper stream side of said one output line is passed to a lower stream side of said one output line with a higher priority than a cell arriving from said one input line, and the cell arriving from said one input line is transferred to the lower stream side of said one output line only when there is no cell arriving from the upper stream side of said one output line.

According to another aspect of the present invention there is provided an ATM switch for switching cells from N input transmission lines to M output transmission lines, where N and M are integers, comprising: N input buffers for temporarily storing cells arriving from input transmission lines; M output buffers for temporarily storing cells to be outputted to output transmission lines; and a matrix type switch formed by N input lines for transmitting the cells read out from the input buffers, M output lines for transmitting the cells to be written into the output buffers, and N×M crosspoints located at intersections of the input lines and the output lines, where each output buffer is connected with one output line such that a jj-th crosspoint at an intersection of of a j-th input line and a j-th output line is set to be a most upper stream side crosspoint among the crosspoints located on said one output line, where j is an integer and $1 \leq j \leq N$, $1 \leq j \leq M$.

Other features and advantages of the present invention will become apparent from the following description taken in conjunction with the accompanying drawings.

BRIEF DESCRIPTION OF THE DRAWINGS

FIG. 24 is an operation characteristic of an optical OR gate in the optical crosspoint of FIG. 21.

DETAILED DESCRIPTION OF THE PREFERRED EMBODIMENTS

Figure 1:
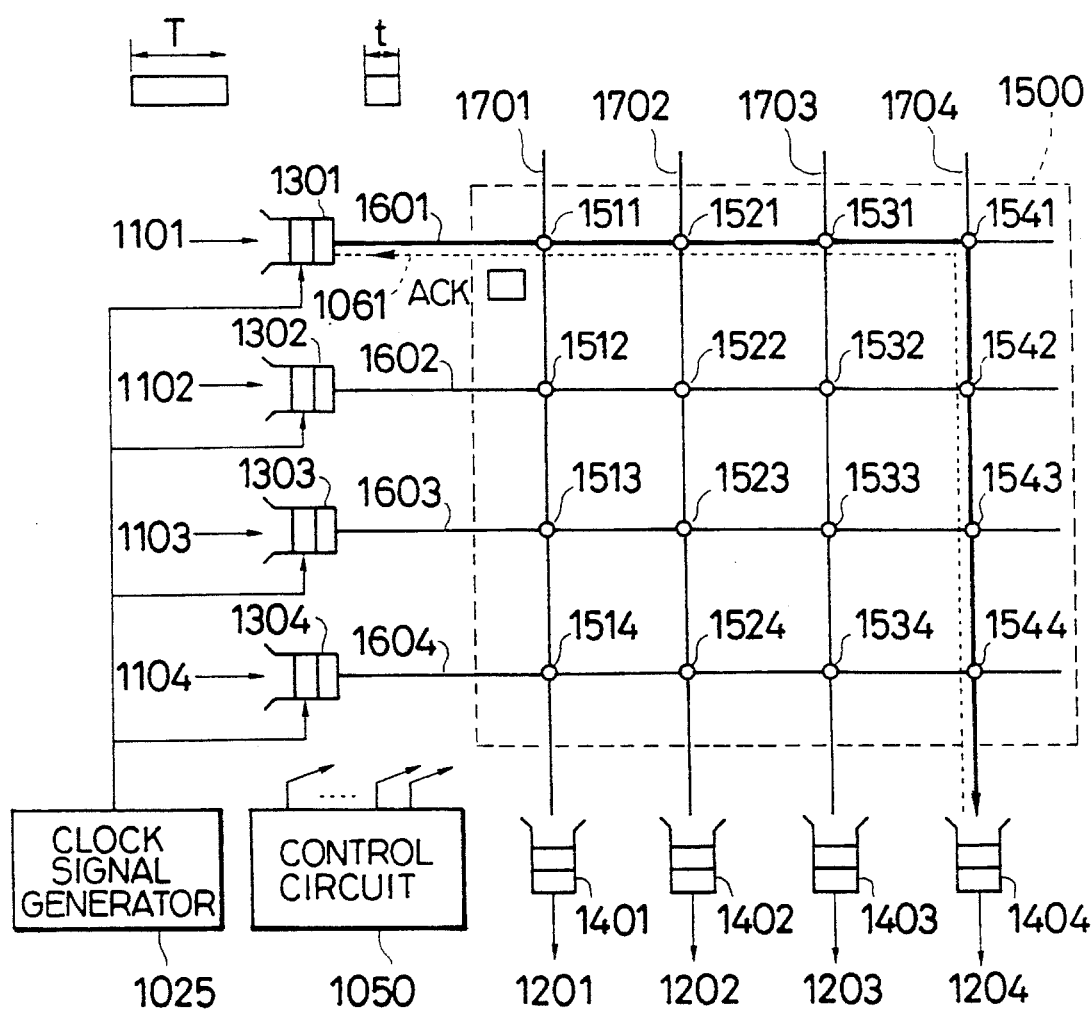
FIG. 1 is a schematic block diagram of an exemplary configuration of a conventional ATM switch.
Figure 2:
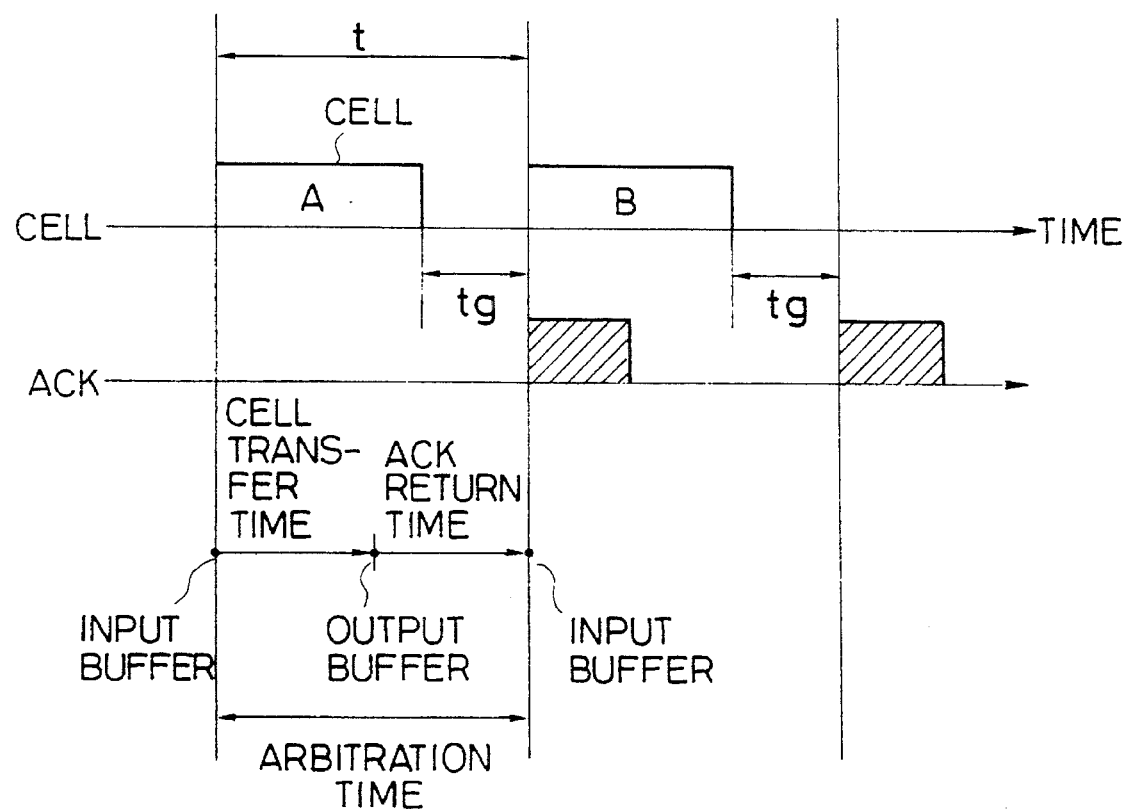
FIG. 2 is a timing chart for the operation of the conventional ATM switch of FIG. 1.
Figure 3:
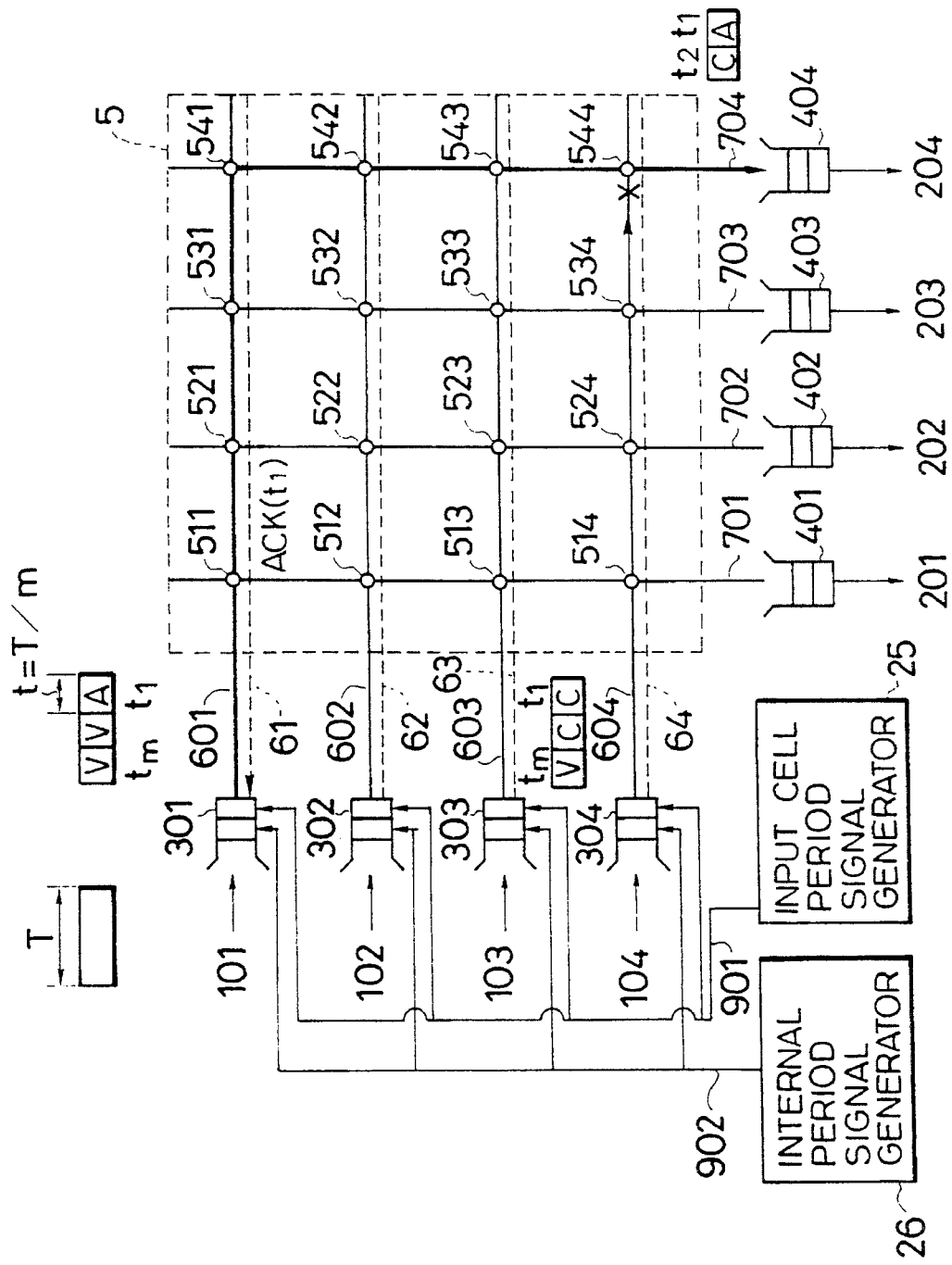
FIG. 3 is a schematic block diagram of the first embdoiment of an ATM switch according to the present invention.

Referring now to FIG. 3, the first embodiment of an ATM switch according to the present invention will be described in detail. In the following, a simplified exemplary case of using a number of input transmission lines (switch size) N=4 and a number of output transmission lines M=4 will be described for the sake of explanation, although these numbers N and M can be set equal to a much larger number such as 128 in the practical implementation.

In this first embodiment of FIG. 3, the ATM switch comprises: four input transmission lines 101–104, four output transmission lines 201–202, four input buffers 301–304 connected with the input transmission lines 101–104, respectively, four output buffers 401–404 connected with the output transmission lines 201–204, and a matrix type switch 5 including four input lines 601–604 connected with the input buffers 301–304, four acknowledge signal lines 61–64 connected with the input buffers 301–304, four output lines 701–704 connected with the output buffers 201–204, and sixteen crosspoints 511–544 for selectively connecting the input lines 601–604 and the output lines 701–704 at their intersections.

In addition, this ATM switch of FIG. 3 is further equipped with an input cell period signal generator 25 for supplying the input cell period T to the input buffers 301–304 through input cell period signal lines 901, and an internal period signal generator 26 for supplying the internal period t to the input buffers 301–304 through internal period signal lines 902.

The reading speed of the input buffers 301–304 and the writing speed of the output buffers 401–404 corresponding to the internal period t are set to be m times the writing speed of the input buffers 301–304 corresponding to the input cell period T, i.e., t=T/m, where 1<m<N. This number m will be referred hereafter as a speed increase rate. Thus, each of the input buffers 301–304 repetitively reads out the same cell in periods of the internal period t, up to m times at most within each input cell period T. On the other hand, the output buffers 401–404 output the stored cells to output transmission lines 201–204 at respective data speeds of the output transmission lines 201–204.

In this first embodiment, each of the crosspoints 511–544 of the matrix type switch 5 independently carries out the arbitration operation according to the simple basic logic that the cell arriving from an upper stream side of the output line is passed to a lower stream side of the output line with a higher priority than the cell arriving from the input line, and the cell arriving from the input line is outputted to the lower stream side of the output line only when there is no cell arriving from the upper stream side of the output line.

In addition, in this first embodiment, one of the crosspoints 511–544 at which the cell arriving from the input line is transferred to the output line returns the acknowledge signal ACK through one of the acknowledge signal lines 61–64 with which it is connected as soon as the cell arriving from the input line is transferred to the output line, such that the input buffer which received this acknowledge signal ACK stops the repetitive reading of the cell.

More specifically, an exemplary operation of this ATM switch of FIG. 3 is carried out in a sequence shown in FIGS. 4 to 6 for an exemplary case of m=3, as follows.

Figure 4:
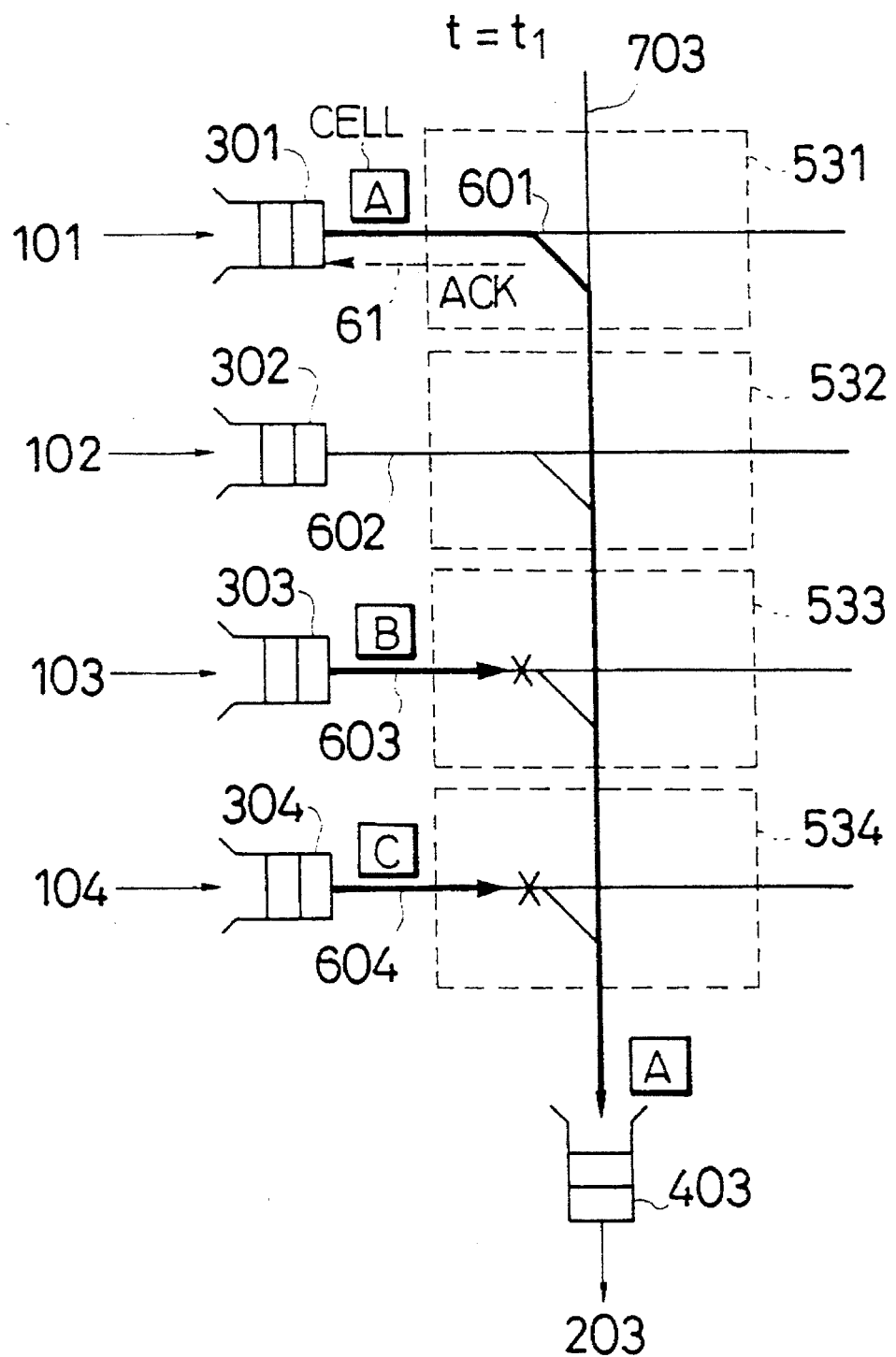
FIGS. 4, 5, and 6 are sequential partial block diagrams of the ATM switch of FIG. 3 for explaining its operation.
Figure 5:
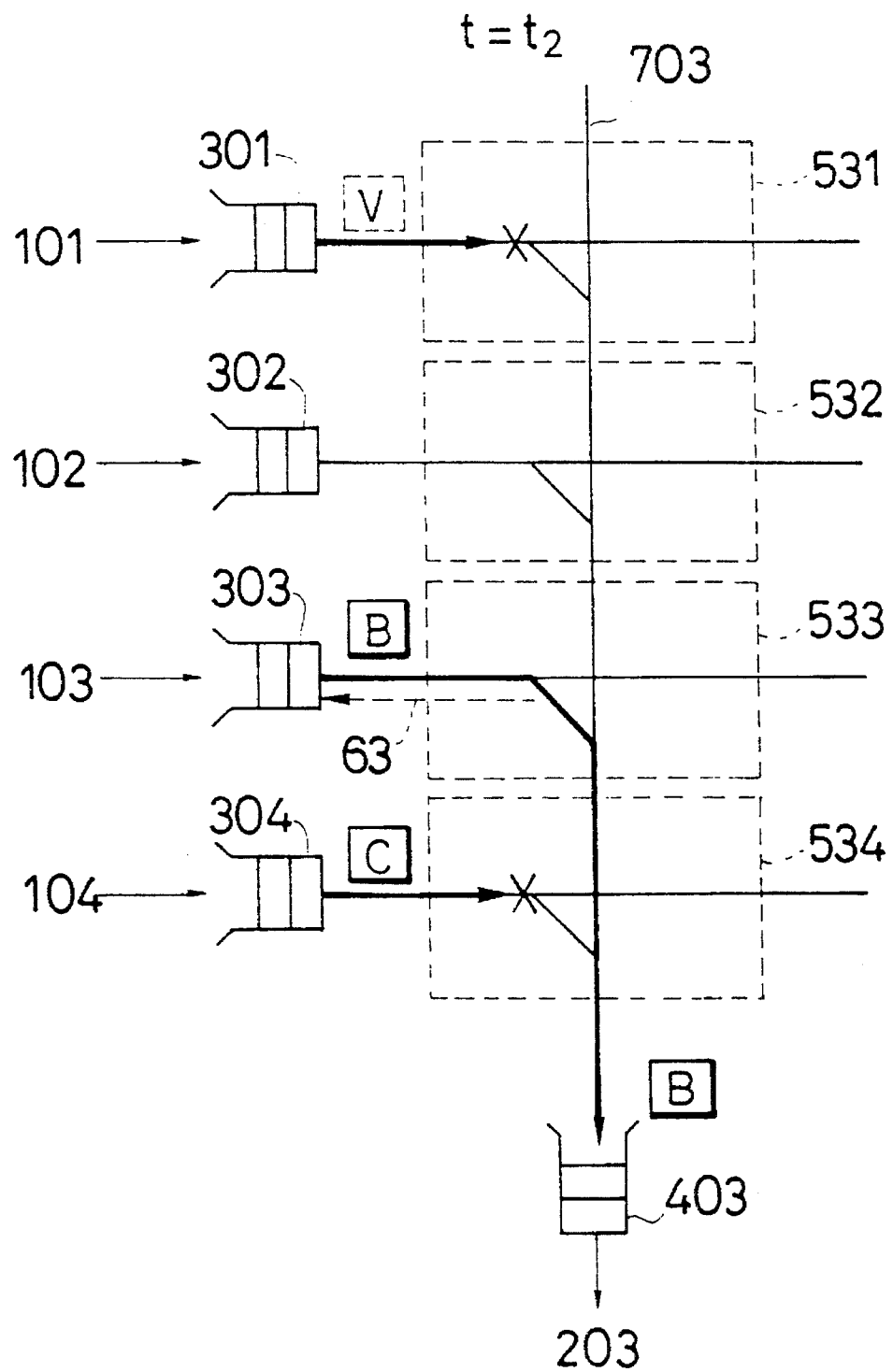
Figure 6:
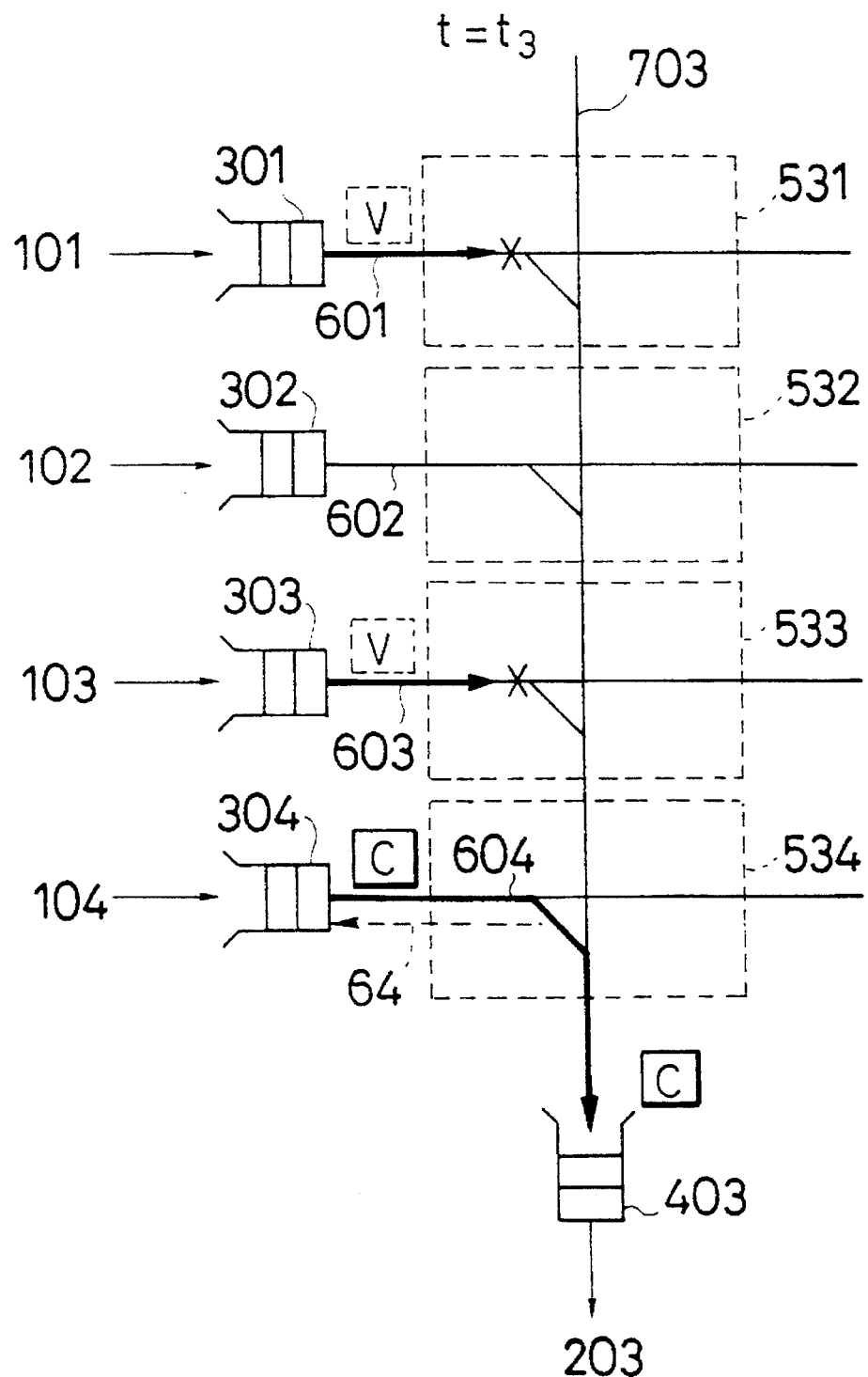

FIGS. 4 to 6 show states of the crosspoints 531–534 on the output line 703 at the first internal period t=t1 for reading out the first cell, the second internal period t=t2 for reading out the second cell, and the third internal period t=t3 for reading out the third cell, respectively, where the cells A, B, and C to be transferred to the output buffer 403 are read out from the input buffers 301, 303, and 304, respectively, while there is no cell at the input buffer 302.

At t=t1 shown in FIG. 4, all of the cells A, B, and C are read out from the input buffers 301, 303, and 304, to the crosspoints 531, 533, and 534, respectively. In this case, the uppermost crosspoint 531 has no cell arriving from the upper stream side, so that the cell A from the input buffer 301 can be transferred to the output line 703, whereas the crosspoints 533 and 534 have this cell A arriving from the upper stream side, so that the cell A is passed to the lower stream side with a higher priority at these crosspoints 533 and 534. Therefore, at this first period, the cell A is transferred through the output line 703 to the output buffer 403 while the cells B and C are rejected as indicated in FIG. 4. In this case, as soon as the cell A is transferred to the output line 703, the crosspoint 531 returns the acknowledge signal ACK through the acknowledge line 61 to the input buffer 301 such that the reading of this cell A at the input buffer 301 will be stopped in the subsequent periods.

At t=t2 shown in FIG. 5, the cells B and C are read out again from the input buffers 303 and 304, to the crosspoints 533 and 534, respectively, while the input buffer 301 outputs a vacant cell V as the reading of the cell A has already stopped at the previous period. In this case, the crosspoint 533 is the uppermost active crosspoint which has no cell arriving from the upper stream side, so that the cell B from the input buffer 303 can be transferred to the output line 703, whereas the crosspoint 534 has this cell B arriving from the upper stream side, so that the cell B is passed to the lower stream side with a higher priority at this crosspoint 534. Therefore, at this second period, the cell B is transferred through the output line 703 to the output buffer 403 while the cell C is rejected as indicated in FIG. 5. In this case, as soon as the cell B is transferred to the output line 703, the crosspoint 533 returns the acknowledge signal ACK through the acknowledge line 63 to the input buffer 303 such that the reading of this cell B at the input buffer 303 will be stopped in the subsequent periods.

At t=t3 shown in FIG. 6, the cell C is read out again from the input buffer 304 to the crosspoint 534, while the input buffers 301 and 303 output vacant cells V as the reading out of the cells A and B have already stopped at the previous periods. In this case, the crosspoint 534 is the uppermost active crosspoint which has no cell arriving from the upper stream side, so that the cell C from the input buffer 304 can be transferred to the output line 703 as indicated in FIG. 5. In this case, as soon as the cell C is transferred to the output line 703, the crosspoint 534 returns the acknowledge signal ACK through the acknowledge line 64 to the input buffer 304 such that the reading of this cell C at the input buffer 303 will be stopped in the subsequent periods.

In this arbitration scheme, if m=N, all the cells from all the input buffers 301–304 can be eventually transferred to the desired output buffers 401–404, but if m< N, the cells which are read out from those input buffers 301–304 near the lower stream side would have a higher chance for being discarded because of the blocking.

Figure 7:
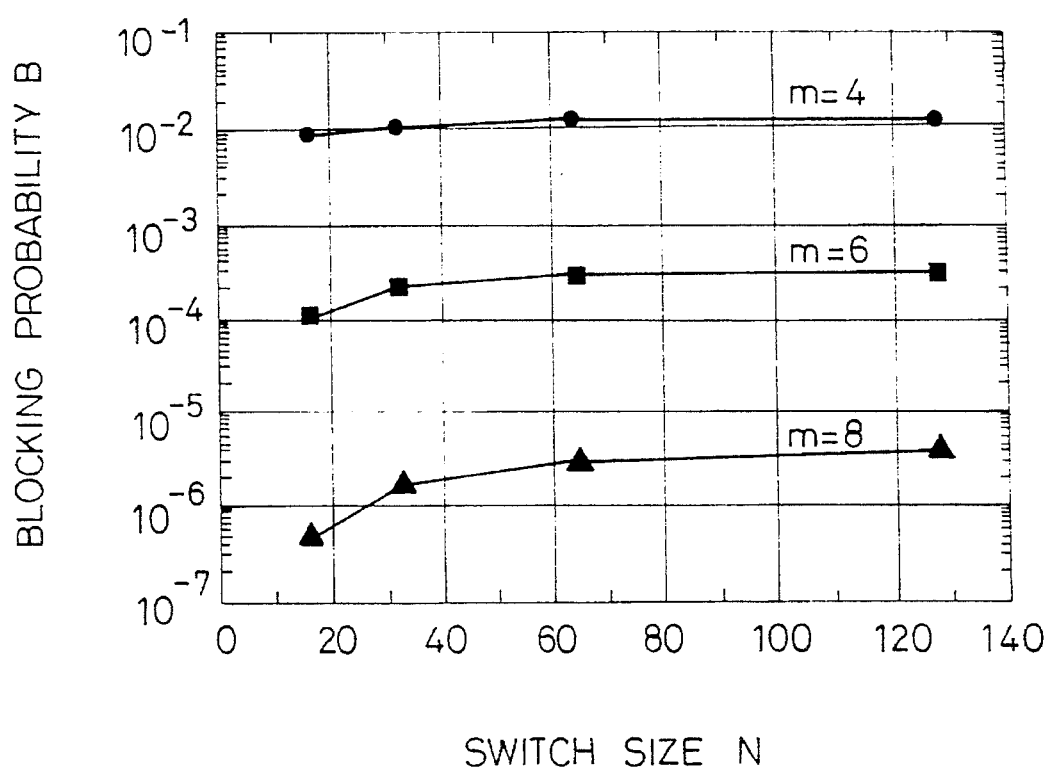
FIG. 7 is a graph of the blocking probability as a function of the switch size for three different values of the speed increase rate in the ATM switch of FIG. 3.

Now, for a case of the load 0.9 random traffic, the blocking probability B for the cell at the lowermost input buffer as a function of the switch size N is as indicated in FIG. 7 for three different values of the speed increase rate m.

Namely, the blocking probability B is exactly zero at the uppermost level, and becomes larger at the levels closer to the lower stream side. In this case, the blocking probability for the cell at the lowermost input buffer can be expressed by the following equation in general.

$$B = \sum_{r=m}^{N-1} {}_{N-1}C_r(\rho/N)^r(1-(\rho/N))^{N-1-r}$$

where $\rho$ is an input load ($0 \leq \rho \leq 1$). By setting this input load $\rho$ to be equal to 0.9, the graphs shown in FIG. 7 can be obtained.

As can be seen in FIG. 7, even when the switch size is large, the blocking probability B can be lowered depending on the speed increase rate. For instance, for a case of m= 4 and N=128, the blocking probability B is about $10^{-2}$ while for a case of m=8 and N=128, the blocking probability B can be made as low as about $10^{-5}$. In addition, by limiting a number of cells that can be outputted within one input cell period, the blocking probability B for the cell at the lowermost input buffer can be reduced sufficiently, while the speed increase rate m can be set independently from the switch size N.

Figure 8:
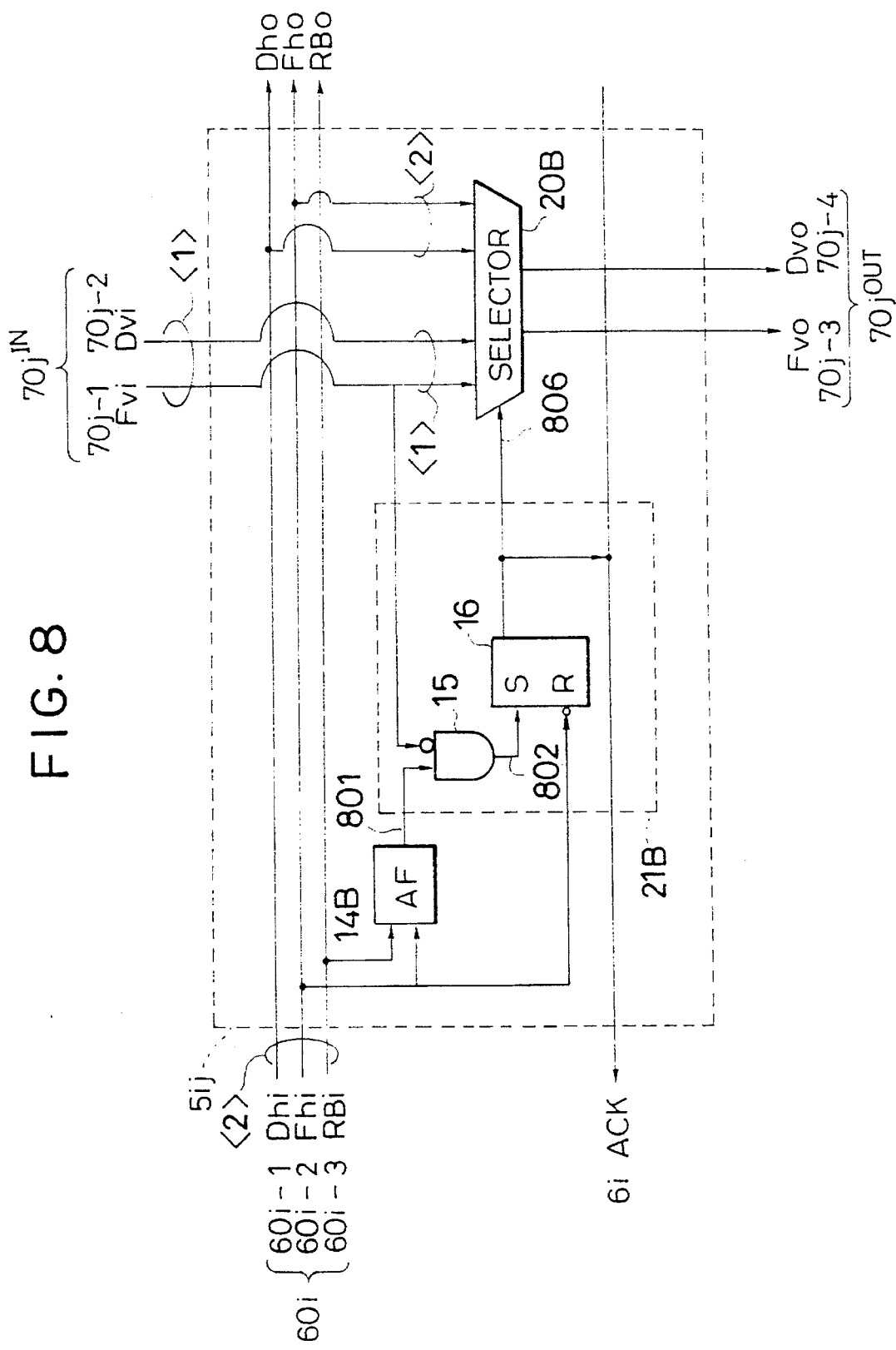
FIG. 8 is a detailed circuit diagram for an exemlary configuration of a crosspoint in the ATM switch of FIG. 3.

In further detail, the ij-th crosspoint $5ij$ at an intersection of an i-th input line and a j-th output line in the matrix type switch 5 of this first embodiment can be formed in an exemplary detailed configuration as shown in FIG. 8.

Figure 9:
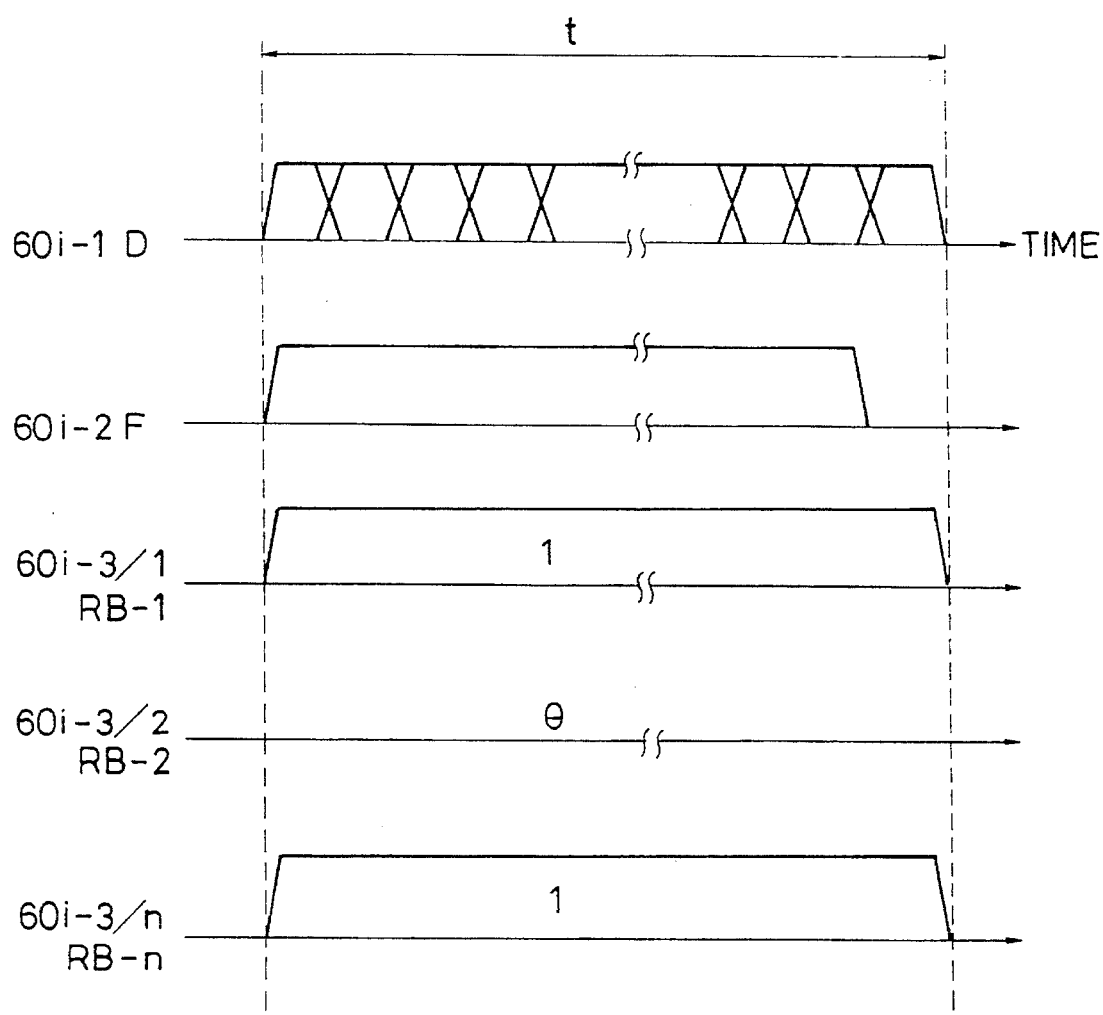
FIG. 9 is a signal diagram for cell, frame signal, and routing signal used in the ATM switch of FIG. 3.

In this configuration of FIG. 8, the input line 60$i$ includes a cell data line 60$i$-1 for transmitting a cell, a frame signal line 60$i$-2 for transmitting a frame signal indicating the presence or absence of the cell in the cell data line 60$i$-1, and a routing signal line 60$i$-3 for transmitting a routing signal indicating an output destination address of the cell in the cell data line 60$i$-1. Here, the cell, the frame signal, and the routing signal are synchronously supplied from the input buffer 30$i$ in parallel, and have signal forms as shown in FIG. 9, where the frame signal F is in a high level except for a last bit whenever the cell exists, and in a low state otherwise, while the routing signal RB is provided in n=log$_2$N lines for representing binary bit values of the output destination address of the cell expressed in binary units, each of which maintains the same level throughout the internal period t. It is also possible to include the output destination address in the cell header, such that the cell header can be used instead of the routing signal RB.

Similarly, the output line 70j includes a cell data line 70j-2 for transmitting a cell and a frame signal line 70j-1 for transmitting a frame signal on an incoming upper stream side $70j^{IN}$, and a cell data line 70j-4 for transmitting a cell and a frame signal line 70j-3 for transmitting a frame signal on an outgoing lower stream side $70j^{OUT}$.

As shown in FIG. 8, the crosspoint 5ij comprises: an address filter (AF) 14B for outputting an output signal 801 in a high level only when the frame signal in the frame signal line 60i-2 indicates the presence of the cell and the output destination address in the routing signal line 60i-3 coincides with the prescribed address to which this crosspoint 5ij can be connected through the output line 70j and which is specified for this crosspoint 5ij in advance; an arbitration circuit 21B for outputting a selector control signal 806 specifying a cell to be outputted to the outgoing output line $70j^{OUT}$ according to the output signal 801 from the address filter 14B and the frame signal in the frame signal line 70j-1; and a selector 20B for selectively connecting either the input line 60i or the incoming output line $70j^{IN}$ to the outgoing output line $70j^{OUT}$ according to the selector control signal 806 from the arbitration circuit 21B.

Figure 10:
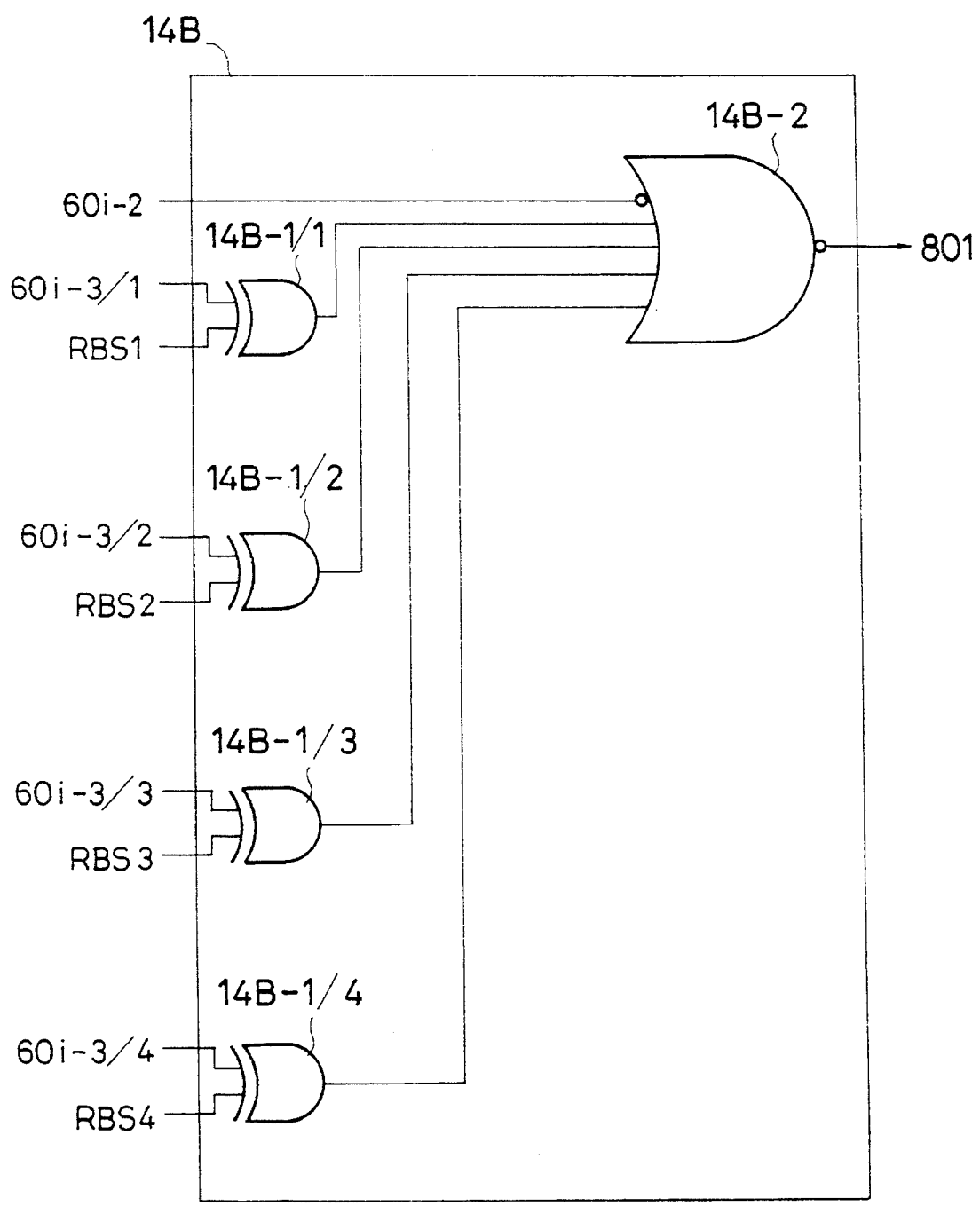
FIG. 10 is a circuit diagram for an address filter in the corsspoint of FIG. 8.

Here, for a 16×16 matrix type switch in which the output destination address of the cell can be represented by 4 binary bits, the address filter 14B has a configuration as shown in FIG. 10, which comprises: four EXOR gates 14B-1/1 to 14B-1/4, each of which has one of the routing signal lines 60i-3/1 to 60i-3/4 and one of the prescribed address bit values RBS1 to RBS4 as its inputs; and a NOR gate 14B-2 which has four outputs of the EXOR gates 14B-1/1 to 14B-1/4 and a negation of the frame signal in the frame signal line 60i-2 as its inputs, and outputs the output signal 801 of the address filter 14B. In a case of a 4×4 matrix type switch as in FIG. 3, the output destination address of the cell can be represented by only 2 binary bits, so that only two EXOR gates is necessary in the address filter 14B.

Also, the arbitration circuit 21B contains an AND gate 15 for taking a product of the output signal 801 from the address filter 14B and the negation of the frame signal in the frame signal line 70j-1 and outputting an output 802, and an SR latch 16 for outputting the selector control signal 806 which is turned into a high level whenever the output 802 of the AND gate 15 supplied to its S terminal is in a high level and maintained at a high level until a negation of the frame signal in the frame signal line 60i-2 supplied to its R terminal. This SR latch 16 is reset to a low level at a start of each input cell period T.

Thus, the selector control signal 806 outputted from this arbitration circuit 21B is in a high level only when the frame signal in the frame signal line 70j-1 indicates the absence of the cell coming from the upper stream side (i.e., in a low level) and the output destination address of the cell entering from the input line 60i coincides with the prescribed address specified for this crosspoint 5ij in advance, and in a low level otherwise, in agreement with the simple basic logic for controlling the crosspoints 511– 544 described above.

This selector control signal 806 is also supplied to the acknowledge line 6i as the acknowledge signal ACK to be returned to the input buffer 30i connected with this crosspoint 5ij. The selector 20B selects the cell <1> in the incoming output line $70j^{IN}$ when the selector control signal 806 is in a low level, and the cell <2> in the input line 60i when the selector control signal 806 is in a high level.

This crosspoint 5ij of FIG. 8 operates according to the timing chart of FIG. 9 as follows. This timing chart of FIG. 11 shows an exemplary case of the speed increase rate m=2 and all the cells entering from the input line 60i has their output destination address coinciding with the prescribed address specified for this crosspoint 5ij in advance, for the sake of simplicity.

Figure 11:
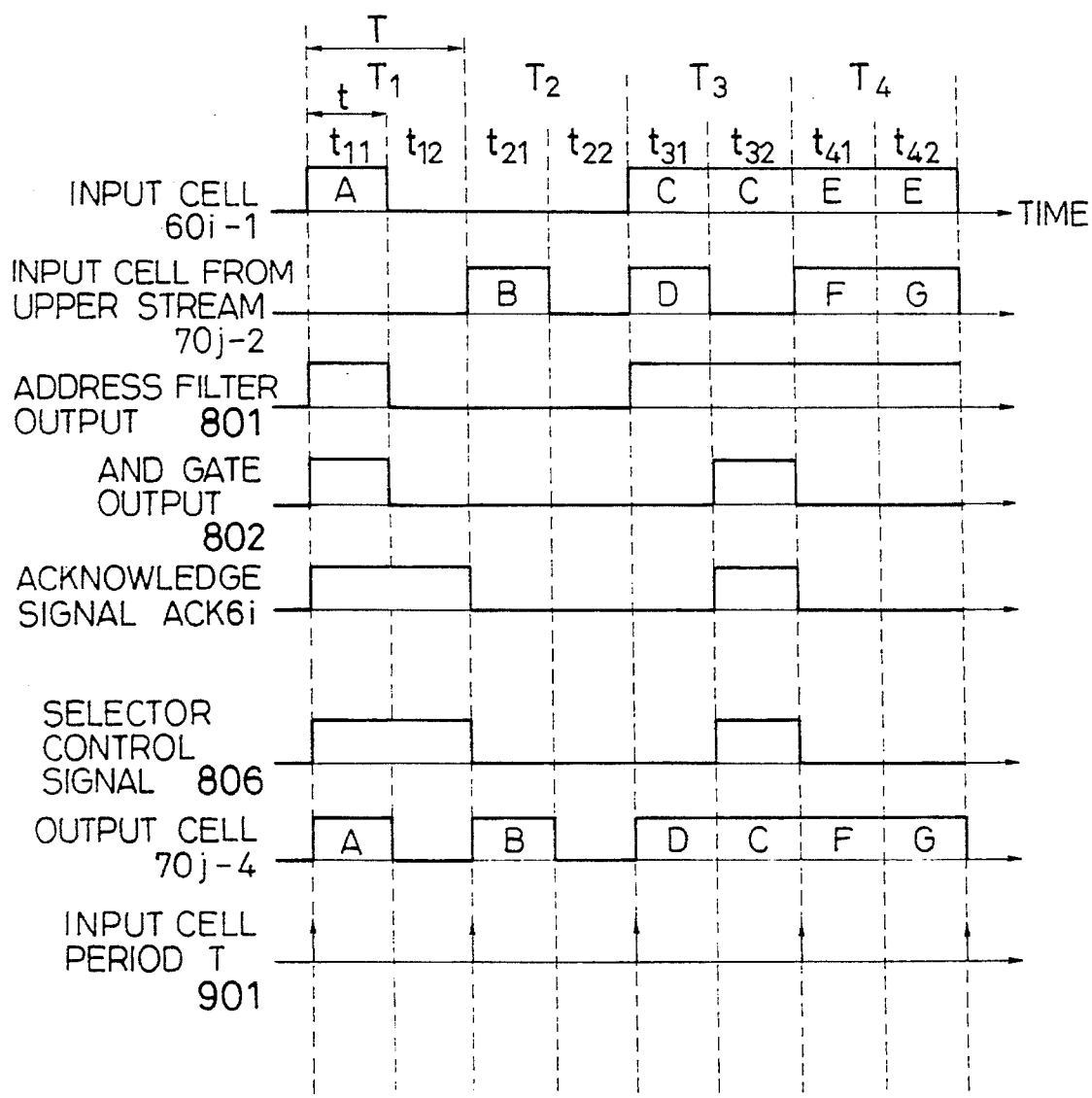
FIG. 11 is a timing chart for the operation of the crosspoint of FIG. 8.

In this timing chart of FIG. 11, at the first input cell period T1, only the cell A from the input line 60i is entered. In this case, the address filter 14B outputs the output signal 801 in a high level as the output destination address of the cell A coincides with the prescribed address, and the output 802 of the AND gate 15 is also in a high level as both of the output signal 801 from the address filter 14B and the negation of the frame signal in the frame signal line 70j-1 are in high levels. Thus, the selector control signal 806 is maintained in a high level throughout this input cell period T1. Consequently, the cell A is transferred to the outgoing output line $70j^{OUT}$ and the acknowledge signal ACK is returned to the input buffer 30i at the internal period t11. At the next internal period t12, the repetitive reading of this cell A is stopped at the input buffer 30i, as the acknowledge signal ACK still remains at a high level.

Next, at the second input cell period T2, only the cell B from the incoming output line $70j^{IN}$ is entered. In this case, the selector control signal 806 remains in a low level throughout this input cell period T2, so that the cell B is passed to the outgoing output line $70j^{OUT}$ at the internal period t21.

Next, at the third input cell period T3, the cell C from the input line 60i and the cell D from the incoming output line $70j^{IN}$ are entered simultaneously. In this case, the address filter 14B outputs the output signal 801 in a high level as the output destination address of the cell C coincides with the prescribed address, but the output 802 of the AND gate 15 is in a low level as the negation of the frame signal in the frame signal line 70j-1 are in a low level. Thus, the selector control signal 806 is in a low level at the internal period t31 so that the cell D is passed to the outgoing output line $70j^{OUT}$ with a higher priority at this internal period t31.

Then, at the next internal period t32, the cell C from the input line 60i is entered from the input buffer 30i again as the acknowledge signal ACK is not received at the previous internal period t31, while no cell is entering from the incoming output line $70j^{IN}$. In this case, the selector control signal 806 is turned into a high level, so that the cell D is transferred to the outgoing output line $70j^{OUT}$ and the acknowledge signal ACK is returned to the input buffer 301 at this internal period t32, such that the repetitive reading of this cell C is stopped.

Figure 12:
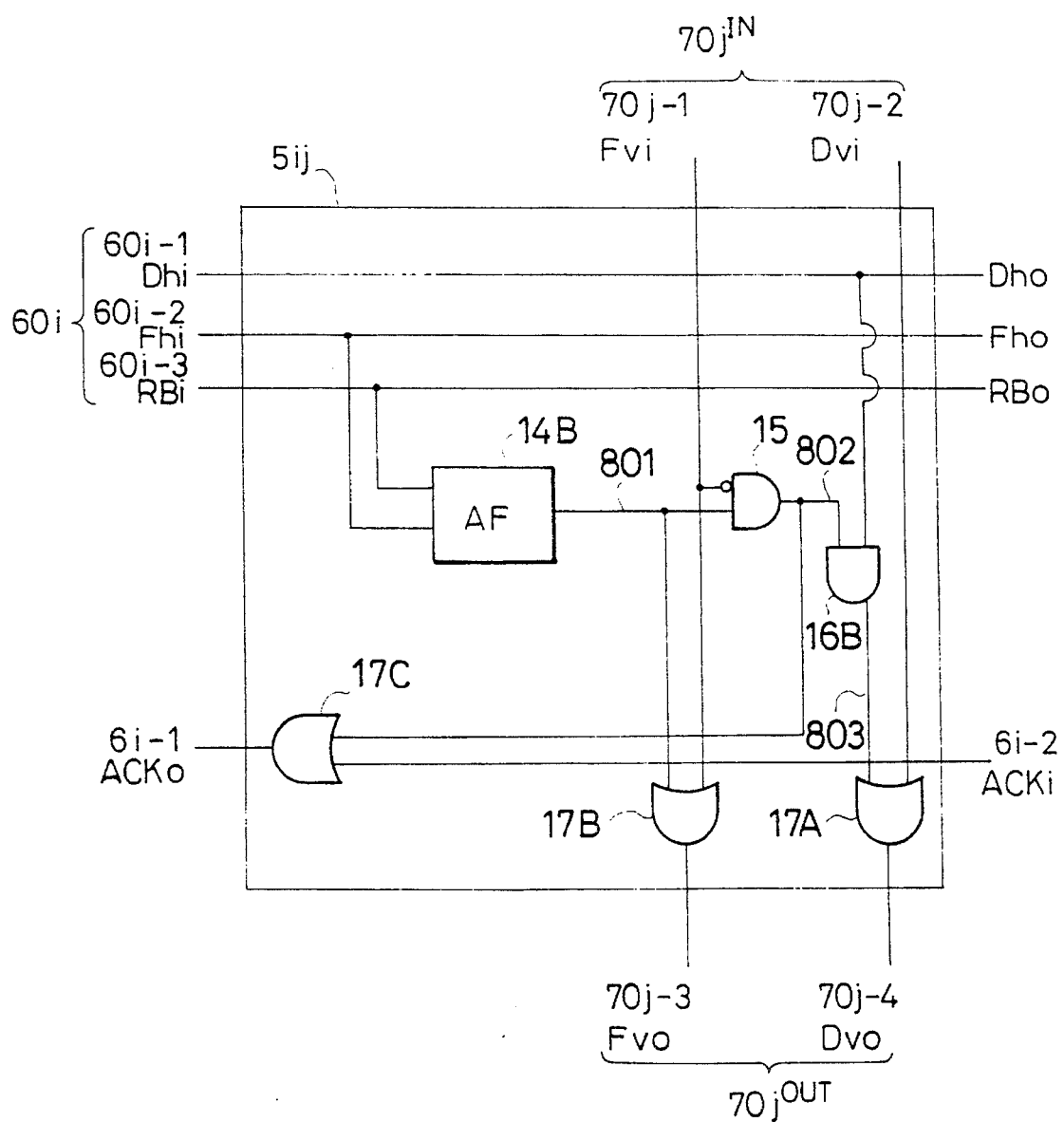
FIG. 12 is a detailed circuit diagram for an alternative simplified configuration of a crosspoint in the ATM switch of FIG. 3.

Alternatively, this ij-th crosspoint 5ij can be formed in a simplified configuration as shown in FIG. 12.

In this configuration of FIG. 12, the crosspoint 5ij comprises: the address filter (AF) 14B and the AND gate 15 similar to those in the configuration of FIG. 8 described above; an AND gate 16B for taking a product of the output signal 802 from the AND gate 15 and the cell in the cell data line 60i-1 and outputting an output 803; an OR gate 17A having the output 803 of the AND gate 16B and the cell in the cell data line 70j-2 of the incoming output line $70j^{IN}$ as its inputs and outputting the cell in the cell data line 70j-4 of the outgoing output line $70j^{OUT}$; an OR gate 17B having the output signal 801 of the address filter 14B and the frame signal in the frame signal line 70j-1 of the incoming output line $70j^{IN}$ as its inputs and outputting the frame signal in the frame signal line 70j-3 of the outgoing output line $70j^{OUT}$; and an OR gate 17C having the output 802 of the AND gate 15 and the acknowledge signal ACK entering from the incoming acknowledge line 6i-2 as its inputs and outputting the acknowledge signal ACK to the outgoing acknowledge line 6i-1.

Thus, the AND gate 16B selectively outputs the cell in the cell data line 60i-1 to the OR gate 17A only when the output 802 of the AND gate 15 is in a high level, i.e., only when the frame signal in the frame signal line 70j-1 indicates the absence of the cell coming from the upper stream side and the output destination address of the cell entering from the input line 60i coincides with the prescribed address specified for this crosspoint 5ij in advance, whereas otherwise the OR gate 17A outputs the cell in the cell data line 70j-2, in agreement with the simple basic logic for controlling the crosspoints 511–544 described above.

The output 802 of the AND gate 15 is also utilized as the acknowledge signal ACK to be returned to the input buffer 30i connected with this crosspoint 5ij.

Figure 13:
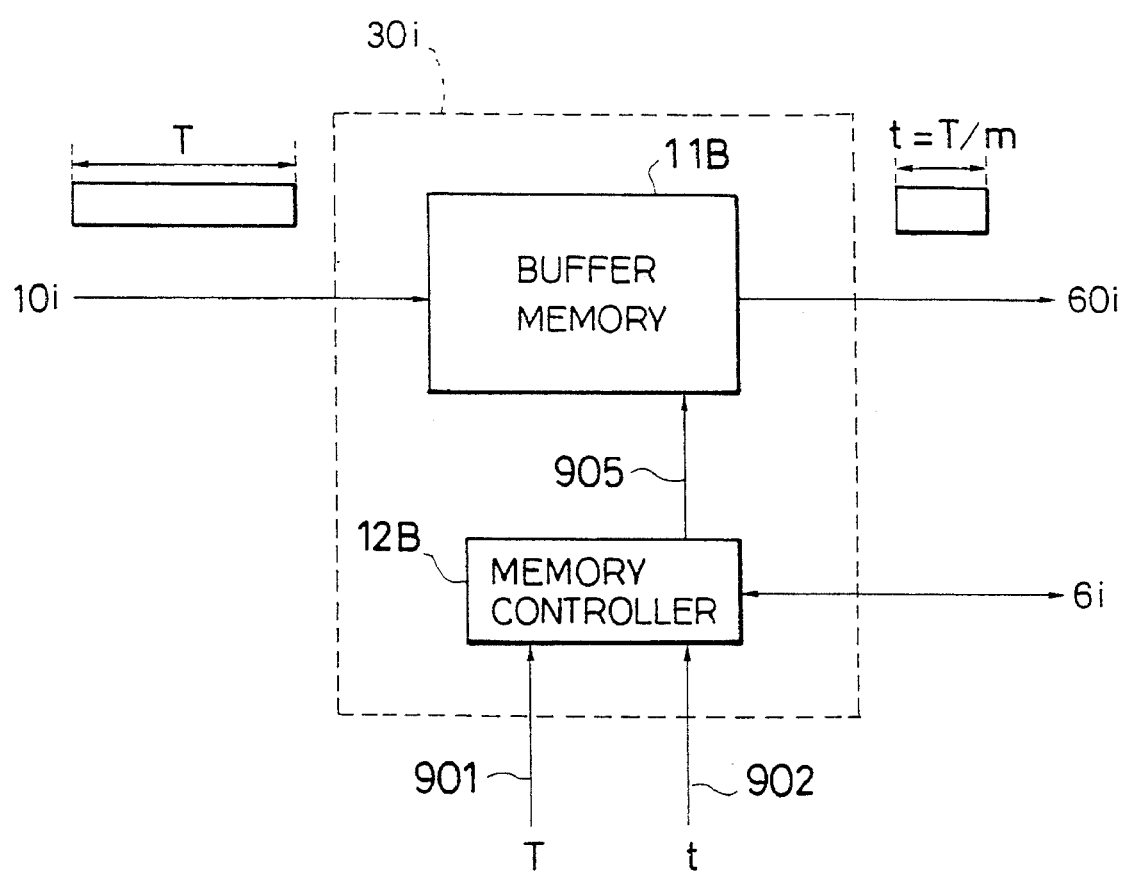
FIG. 13 is a detailed circuit diagram for an exemplary configuration of an input buffer in the ATM switch of FIG. 18.

On the other hand, the i-th input buffer 30i of this first embodiment can be formed in an exemplary detailed configuration as shown in FIG. 13.

In this configuration of FIG. 13, the input buffer 30i comprises: a buffer memory 11B for temporarily storing the cells entered from the input transmission line 10i and outputting each stored cell along with frame signal and routing signal associated with it to the input line 60i of the matrix type switch 5; and a memory controller 12B for controlling a cell read out operation of the buffer memory 11B by a reading control signal 905 generated according to the input cell period T specified through the input cell period signal line 901, the internal period t specified through the internal period signal line 902, and the acknowledge signal ACK returned from the acknowledge line 6i.

In this input buffer 30i of FIG. 13, each stored cell is repetitively read out to the input line 60i at the speed which is m times the writing speed of the input buffer 30i, in periods of the internal period t, up to m times at most within each input cell period T, until the acknowledge signal ACK is returned through the acknowledge line 6i. Also, at a time of the writing a new cell from the input transmission line 10i, if the amount of stored cells is going to exceed the memory capacity of the buffer memory 11B, the new cell is discarded.

Also, in this first embodiment, the operation of each input buffer 30i is limited such that only one cell can reach from each input buffer 30i to any output buffer 40j within each input cell period T, so as to keep the cell loss probability at each input buffer 30i below a prescribed level. Without this limitation, the cell loss probability at the input buffer 30i closer to the lower stream side can be undesirably large.

This input buffer 30i of FIG. 13 operates according to the timing chart of FIG. 14 as follows. This timing chart of FIG. 14 shows an exemplary case of the speed increase Fate m=4.

Figure 14:
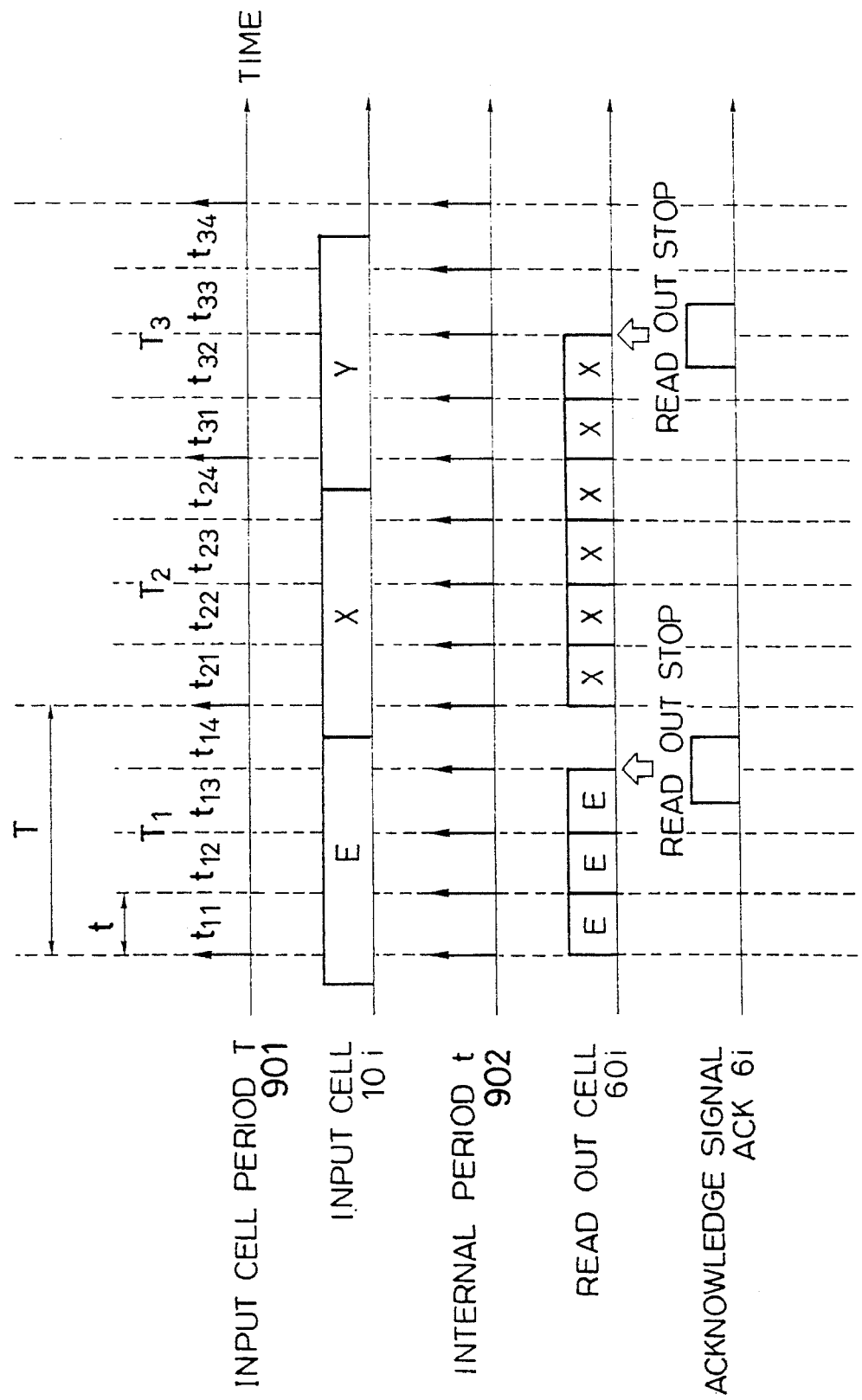
FIG. 14 is a timing chart for the operation of the input buffer of FIG. 13.

In this timing chart of FIG. 14, at the first input cell period T1, the cell read out operation is interrupted after the acknowledge signal ACK is received, because there is a limitation that only one cell can reach from each input buffer 30i to any output buffer 40j within each input cell period T as described above. In contrast, the repetitive reading of the cell X which has started at the second input cell period T2 is continued into the third input cell period T3 until the acknowledge signal ACK is received.

Figure 15:
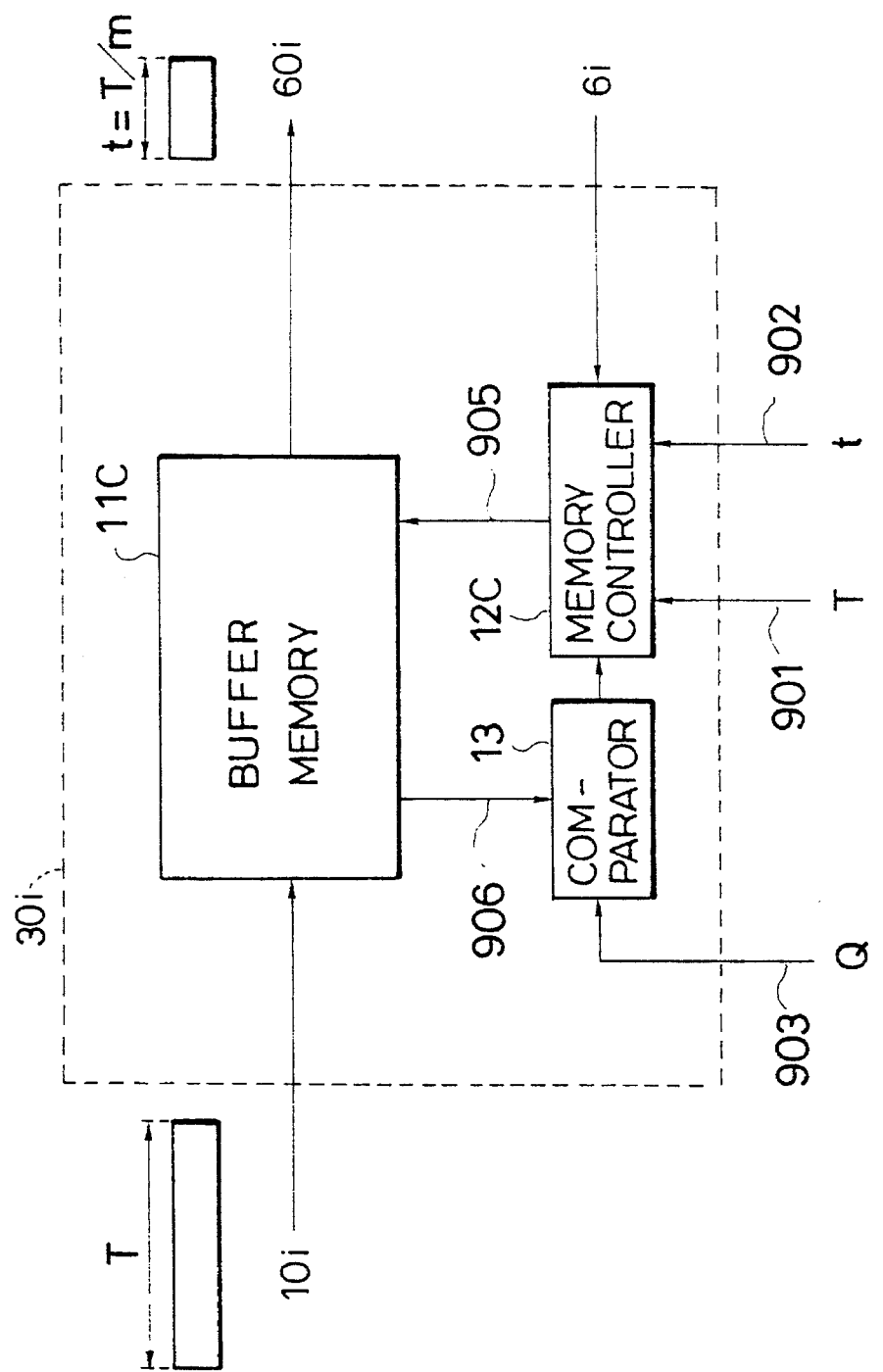
FIG. 15 is a detailed circuit diagram for an alternative modified configuration of an input buffer in the ATM switch of FIG. 3.

Alternatively, the i-th input buffer 30i of this first embodiment can be formed in a modified configuration as shown in FIG. 15.

In this configuration of FIG. 15, the input buffer 30i comprises: the buffer memory 11C for temporarily storing the cells entered from the input transmission line 10i and outputting each stored cell to the input line 60i of the matrix type switch 5, which constantly measures the actual queue length 906 representing a number of cells currently stored within itself; a memory controller 12C for controlling a cell read out operation of the buffer memory 11C by a reading control signal 905 generated according to the input cell period T specified through the input cell period signal line 901, the internal period t specified through the internal period signal line 902, and the acknowledge signal ACK returned from the acknowledge line 6i; and a comparator 13 for comparing the actual queue length 906 reported from the buffer memory 11C with a prescribed threshold queue length Q 903, and supplying a comparison signal 904 to interrupt the read out control by the memory controller 12C.

In this input buffer 30i of FIG. 15, each stored cell is repetitively read out to the input line 60i at the speed which is m times the writing speed of the input buffer 30i, in periods of the internal period t, up to m times at most within each input cell period T, until either the acknowledge signal ACK is returned through the acknowledge line 6i, or the actual queue length 906 exceeds the prescribed threshold queue length Q 903. When the comparator 13 detects that the actual queue length 906 has exceeded the prescribed threshold queue length Q 903 while a certain cell is repetitively read out, the comparator 13 outputs the comparison signal 904 to interrupt the read out control by the memory controller 12C at an end of the current input cell period T, so as to stop reading that certain cell and compulsorily discard that certain cell.

Also, just as in the configuration of FIG. 13 described above, the operation of each input buffer 30i is limited such that only one cell can reach from each input buffer 30i to any output buffer 40j within each input cell period T, so as to keep the cell loss probability at each input buffer 30i below a prescribed level.

This input buffer 30i of FIG. 15 operates according to the timing chart of FIG. 16 as follows. This timing chart of FIG. 16 shows an exemplary case of the speed increase rate m=4 and the prescribed threshold queue length Q=2.

Figure 16:
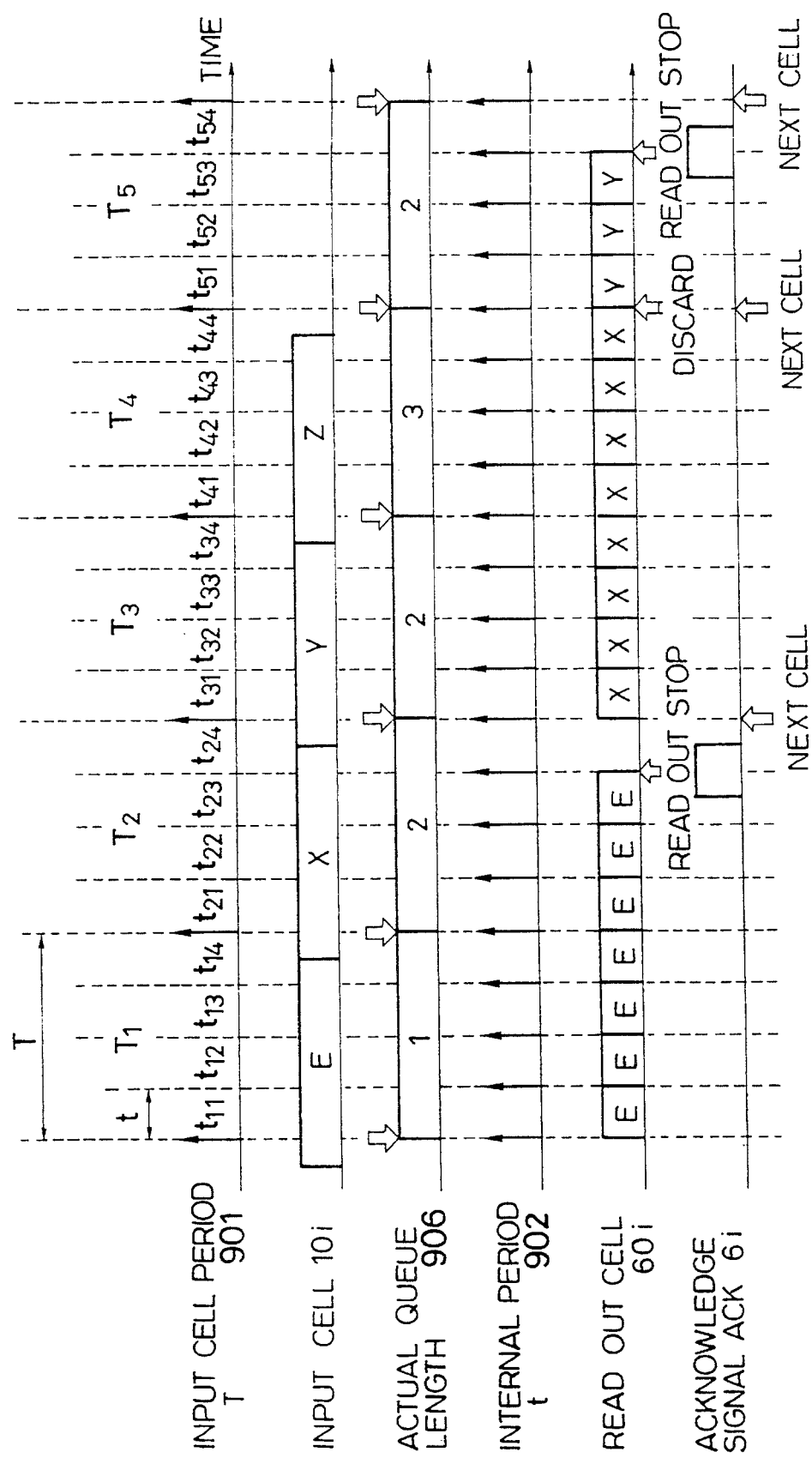
FIG. 16 is a timing chart for the operation of the input buffer of FIG. 15.

In this timing chart of FIG. 16, at the second input cell period T2, the cell read out operation is interrupted after the acknowledge signal ACK is received, because there is a limitation that only one cell can reach from each input buffer 30i to any output buffer 40j within each input cell period T as described above. In contrast, the repetitive reading of the cell X which has started at the third input cell period T3 is continued into the fourth input cell period T4 but interrupted at the end of this fourth input cell period T4 before the acknowledge signal ACK is received, because the actual queue length 906 becomes three which is exceeding the prescribed threshold queue length Q in this input cell period T4. Consequently, the reading of the next cell Y is started in the next input cell period T5.

As described, according to this first embodiment of the present invention, the arbitration In the ATM switch is achieved by distributing this function over a plurality of crosspoints 5ij while adopting the simple basic logic described above at each crosspoint 5ij, and the acknowledge signal ACK is returned from the crosspoints 5ij to the input buffers 30i so as to reduce the time required for the arbitration to half, so that it becomes possible to provide an ATM switch capable of improving the throughput by the simplified arbitration scheme and circuit configuration at low cost, in which the arbitration time and the blocking probability can be reduced without requiring an increase of the switch operation speed.

Also, by setting the internal speed of the ATM switch to be m times faster than that of the cell speed, and limiting the operation of each input buffer 30i such that only one cell can reach from each input buffer 30i to any output buffer 40j within each Input cell period T, it also becomes possible to keep the cell loss probability at each input buffer 30i below a prescribed level.

Figure 17:
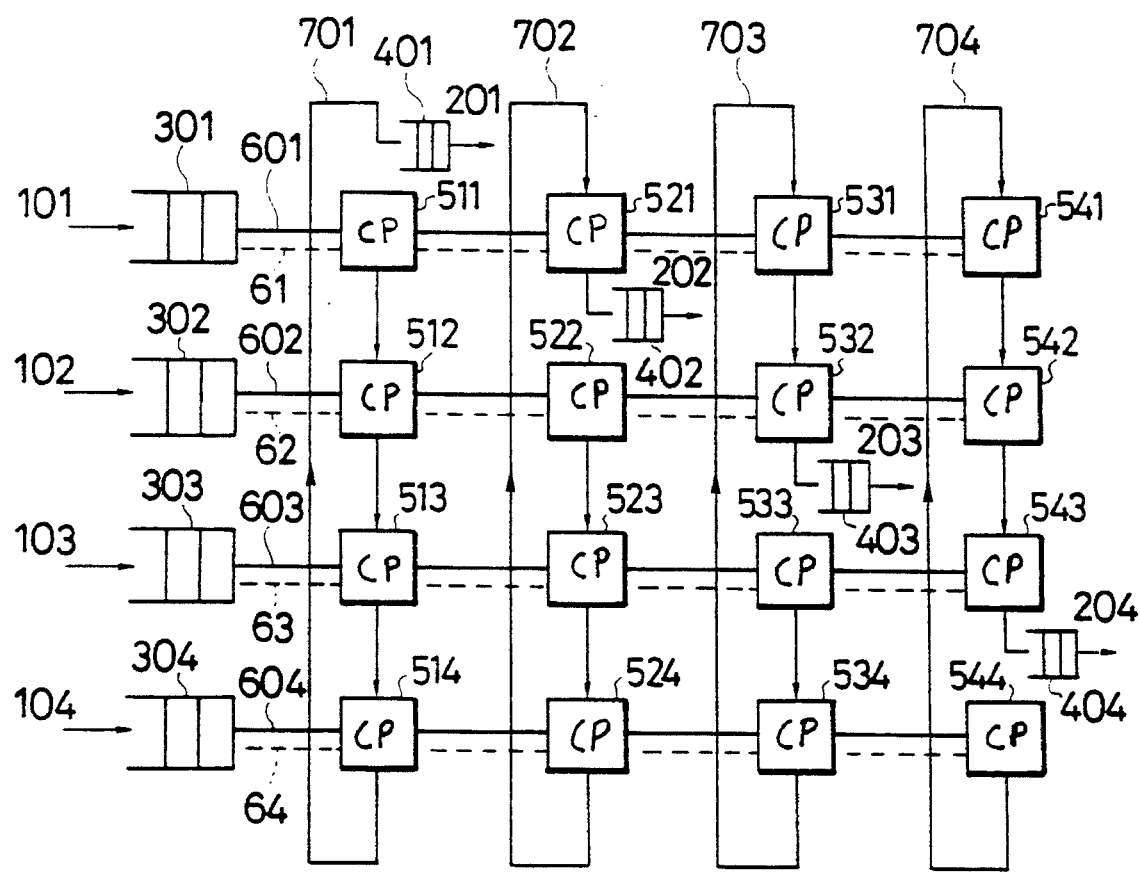
FIG. 17 is a schematic block diagram of the second embdoiment of an ATM switch according to the present invention.

Referring now to FIG. 17, the second embodiment of an ATM switch according to the present invention will be described in detail.

This second embodiment differs from the first embodiment of FIG. 3 described above in that the matrix type switch 5 is modified as shown in FIG. 17 such that the highest priority crosspoint on each output line 70j is set to be the crosspoint 5jj, so that the highest priority crosspoints are located on different input lines 60i. Namely, as shown in FIG. 17, the crosspoint (CP) 511 on the input line 60i has the highest priority among the crosspoints (CP) 511–514 on the output line 701, the crosspoint (CP) 522 on the input line 602 has the highest priority among the crosspoints (CP) 521–524 on the output line 702, the crosspoint (CP) 533 on the input line 603 has the highest priority among the crosspoints (CP) 531–534 on the output line 703, and the crosspoint (CP) 544 on the input line 604 has the highest priority among the crosspoints (CP) 541–544 on the output line 704.

The remaining features of this second embodiment are substantially equivalent to those of the first embodiment described above.

In this second embodiment, in addition to the advantages similar to those described above for the first embodiment, the cell output probability of each input buffer 30i can be made even among the input buffers 30i, so that it is sufficient for the setting of the speed increase rate m as low as two to achieve the effective arbitration.

Figure 18:
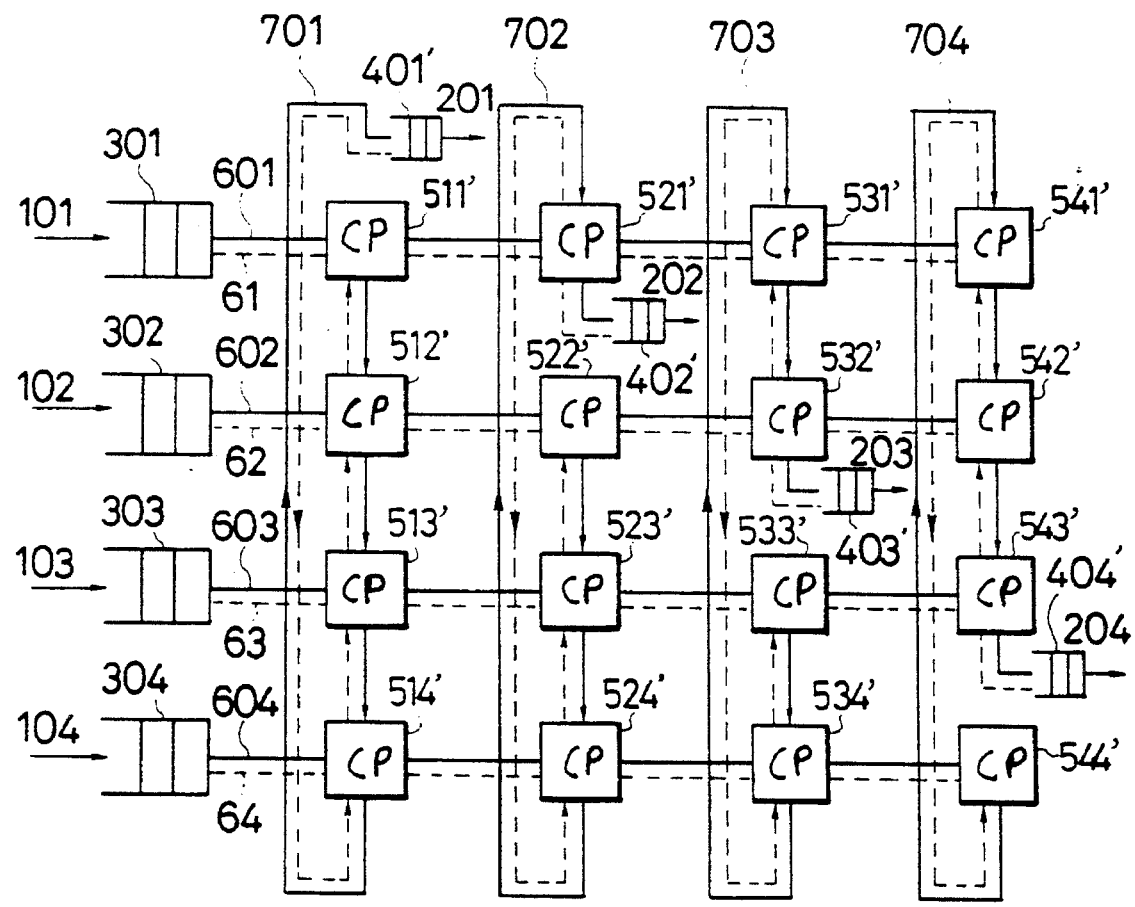
FIG. 18 is a schematic block diagram of the third embdoiment of an ATM switch according to the present invention.

Referring now to FIG. 18, the third embodiment of an ATM switch according to the present invention will be described in detail.

This third embodiment of FIG. 18 differs from the second embodiment of FIG. 17 described above in that each crosspoint 5ij' independently carries out the arbitration operation according to the different basic logic that the cell arriving from the input line is outputted to the lower stream side of the output line with a higher priority than the cell arriving from the upper stream side of the output line, and the cell arriving from an upper stream side of the output line is passed to the lower stream side of the output line only when there is no cell arriving from the input line.

Thus, as shown in FIG. 18, the crosspoint (CP) 514' on the input line 604 has the highest priority among the crosspoints (CP) 511'–514' on the output line 701, the crosspoint (CP) 521' on the input line 601 has the highest priority among the crosspoints (CP) 521'–524' on the output line 702, the crosspoint 532' on the input line 602 has the highest priority among the crosspoints (CP) 531'–534' on the output line 703, and the crosspoint (CP) 543' on the input line 603 has the highest priority among the crosspoints (CP) 541'–544' on the output line 704.

In addition, in this third embodiment, the acknowledge signal ACK is to be returned from the output buffers 40j' through the crosspoints 5ij' to the input buffers 30i, so that the configuration of FIG. 18 is further equipped with vertical acknowledge lines 71–74 through which the acknowledge signal ACK can be transmitted to the crosspoint 5ij' in a direction opposite to that of the transmission of the cells in the output lines 701–704.

The remaining features of this second embodiment are substantially equivalent to those of the second embodiment described above.

In this third embodiment, the major advantages of the first embodiment described above are lost, but the cell output probability of each input buffer 30i can be made even among the input buffers 30i, so that it is sufficient for the setting of the speed increase rate m as low as two to achieve the effective arbitration Just as in the second embodiment described above. In addition, as the arbitration control circuit becomes unnecessary, the hardware size of the entire ATM switch can be reduced.

Figure 19:
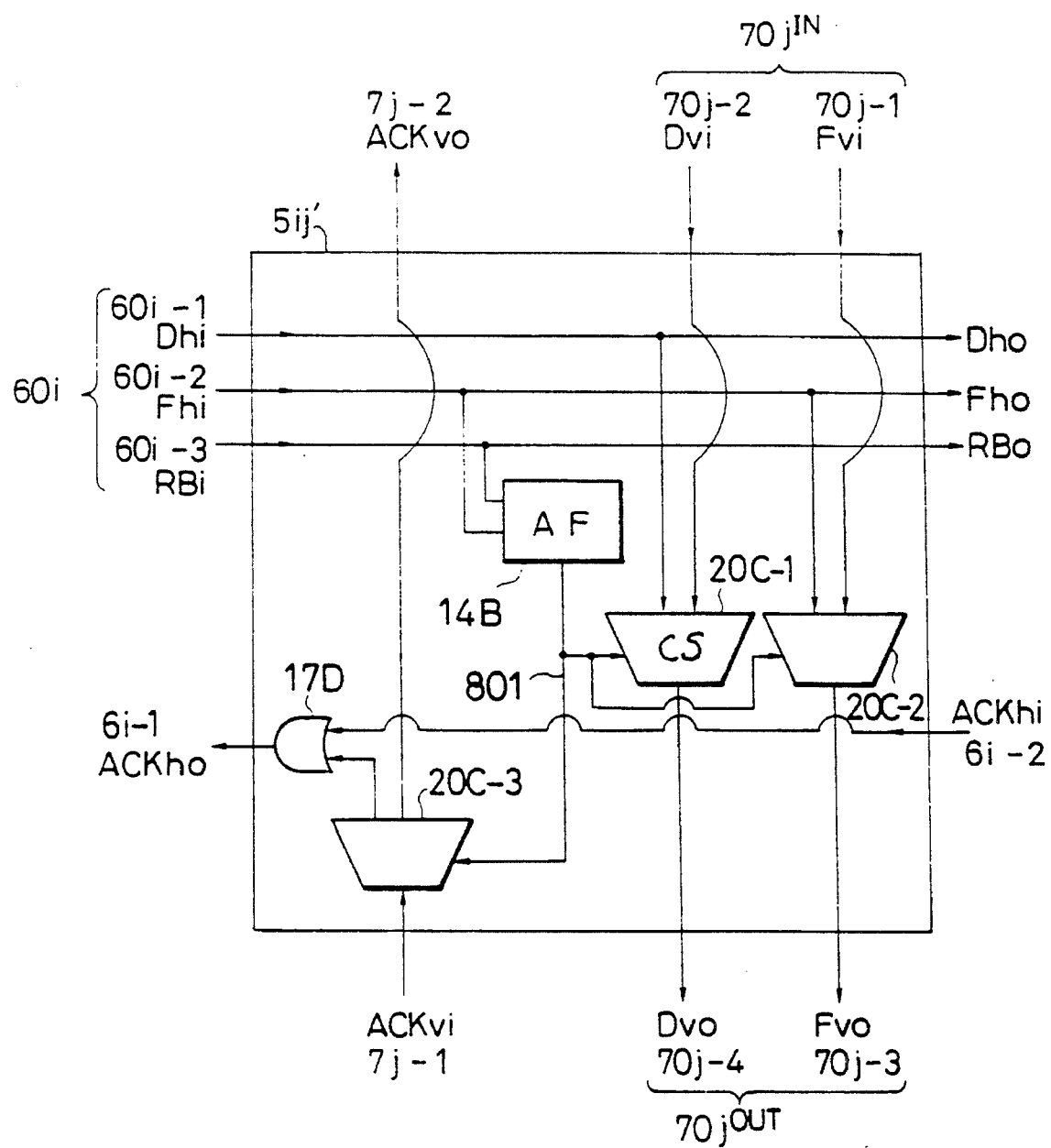
FIG. 19 is a detailed circuit diagram for an exemlary configuration of a crosspoint in the ATM switch of FIG. 18.

In further detail, in this third embodiment, the ij-th crosspoint 5ij' at an intersection of an i-th input line and a j-th output line can be formed in an exemplary detailed configuration as shown in FIG. 19.

In this configuration of FIG. 19, the crosspoint 5ij' comprises: the address filter (AF) 146 similar to that in the configuration of FIG. 8 described above; a cell selector (CS) 20C-1 for selectively connecting either the cell data line 60i-1 of the input line 60i or the cell data line 70j-2 of the incoming output line $70j^{IN}$ to the cell data line 70j-4 of the outgoing output line $70j^{OUT}$ according to the output signal 801 from the address filter 14B; a frame signal selector (FSS) 20C-2 for selectively connecting either the frame signal line 60i-2 of the input line 60i or the frame signal line 70j-1 of the incoming output line $70j^{IN}$ to the Frame signal line 70j-3 of the outgoing output line $70j^{OUT}$ according to the output signal 801 from the address filter 14B; an acknowledge signal selector (ASS) 20C-3 for selectively connecting the acknowledge signal ACK coming from the lower stream side at the vertical acknowledge line 7j-1 on the vertically incoming side to either the acknowledge line 6i-1 on the horizontally outgoing side or the vertical acknowledge line 7j-2 on the vertically outgoing side according to the output signal 801 from the address filter 14B; and an OR gate 17D having the acknowledge signal ACK coming from the acknowledge line 6i-2 on the horizontally incoming side and the acknowledge signal ACK coming from the vertical acknowledge line 7j-1 on the vertically incoming side as its inputs and outputting the acknowledge signal ACK in the acknowledge line 6i-1 on the horizontally outgoing side.

Thus, the cell selector 20C-1 and the frame signal selector 20C-2 selectively output the cell in the cell data line 60i-1 and the frame signal in the frame signal line 60i-2 to the outgoing output line $70j^{OUT}$ when the output signal 801 of the address filter 14B is in a high level, whereas otherwise the cell selector 20C-1 and the frame signal selector 20C-2 output the cell in the cell data line 70j-2 and the frame signal in the frame signal line 70j-1, in agreement with the different basic logic for controlling the crosspoints 511'–544' described above.

The acknowledge signal selector 20C-3 selectively outputs the acknowledge signal ACK coming from the vertical acknowledge line 7j-1 on the vertically incoming side either to the OR gate 17D when the output signal 801 of the address filter 14B is in a high level, or to the vertical acknowledge line 7j-2 on the vertically outgoing side, in accordance with the operations of the cell selector 20C-1 and the frame signal selector 20C-2.

Figure 20:
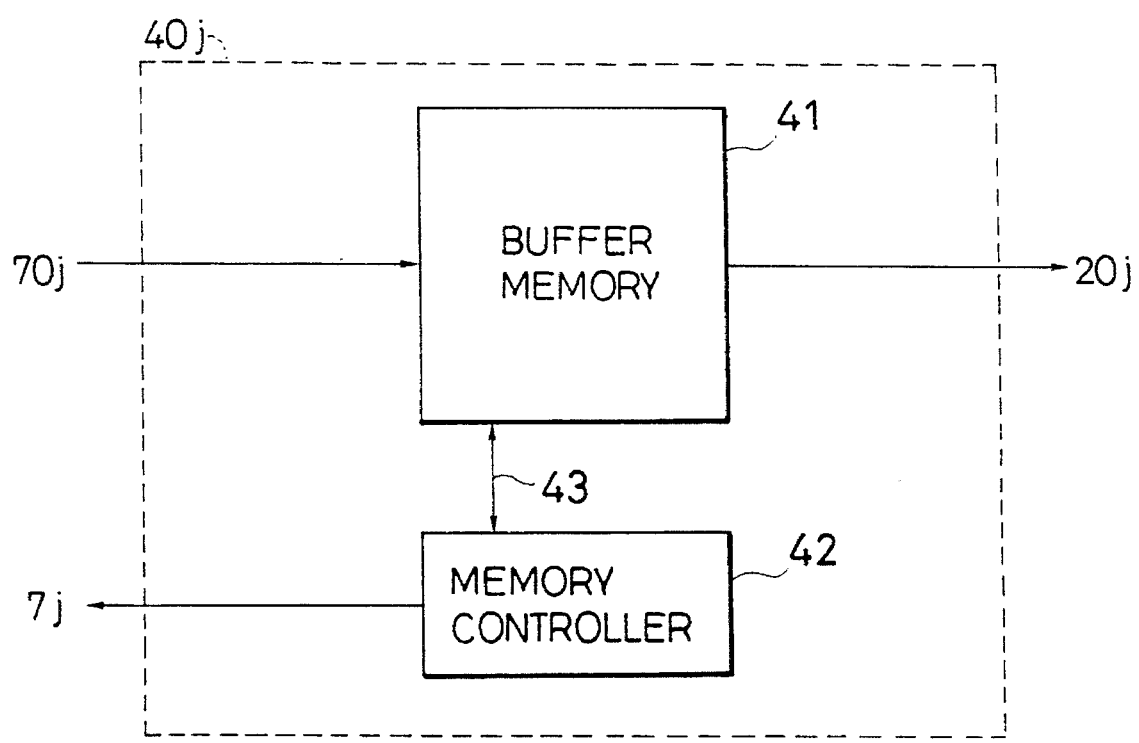
FIG. 20 is a detailed circuit diagram for an exemplary configuration of an output buffer in the ATM switch of FIG. 3.

On the other hand, the j-th output buffer 40j of this third embodiment can be formed in an exemplary detailed configuration as shown in FIG. 20.

In this configuration of FIG. 20, the output buffer 40j comprises: a buffer memory 41 for temporarily storing the cells entered from the output line 70j and outputting each stored cell to the output transmission line 20j; and a memory controller 42 for controlling a cell writing operation of the buffer memory 41 by a writing control signal 43, and generating the acknowledge signal ACK to be returned through the vertical acknowledge line 7j for the cell stored in the buffer memory 41. The output buffer 40j outputs the stored cells to output transmission line 20*j* at the data speed of the output transmission line 20*j*.

Now, because of the advantages of the present invention as described above for the first and second embodiments, the ATM switch of the present invention is also suitable for the application to the optical ATM switch device, which will now be described in detail as the fourth embodiment.

In this fourth embodiment, the optical ATM switch device has an overall configuration similar to that shown in FIG. 3 for the first embodiment described above, except that each element is an optical one capable of handling the optical cell and the optical frame signal. Thus, the optical input line 60*i*" includes an optical cell data line 60*i*-1" for transmitting an optical cell, and an optical frame signal line 60*i*-2" for transmitting an optical frame signal indicating the presence or absence of the optical cell in the optical cell data line 60*i*-1", where the optical frame signal has a power over a prescribed level in a case of indicating the presence of the optical cell, and the output destination address of the optical cell is indicated by the wavelength of the optical frame signal. Similarly, the optical output line 70*j*" includes an optical cell data line 70*j*-2" for transmitting an optical cell and an optical frame signal line 70*j*-1" for transmitting an optical frame signal on an incoming upper stream side 70*j*$^{IN"}$, and an optical cell data line 70*j*-4" for transmitting an optical cell and an optical frame signal line 70*j*-3" for transmitting an optical frame signal on an outgoing lower stream side 70*j*$^{OUT"}$.

Figure 21:
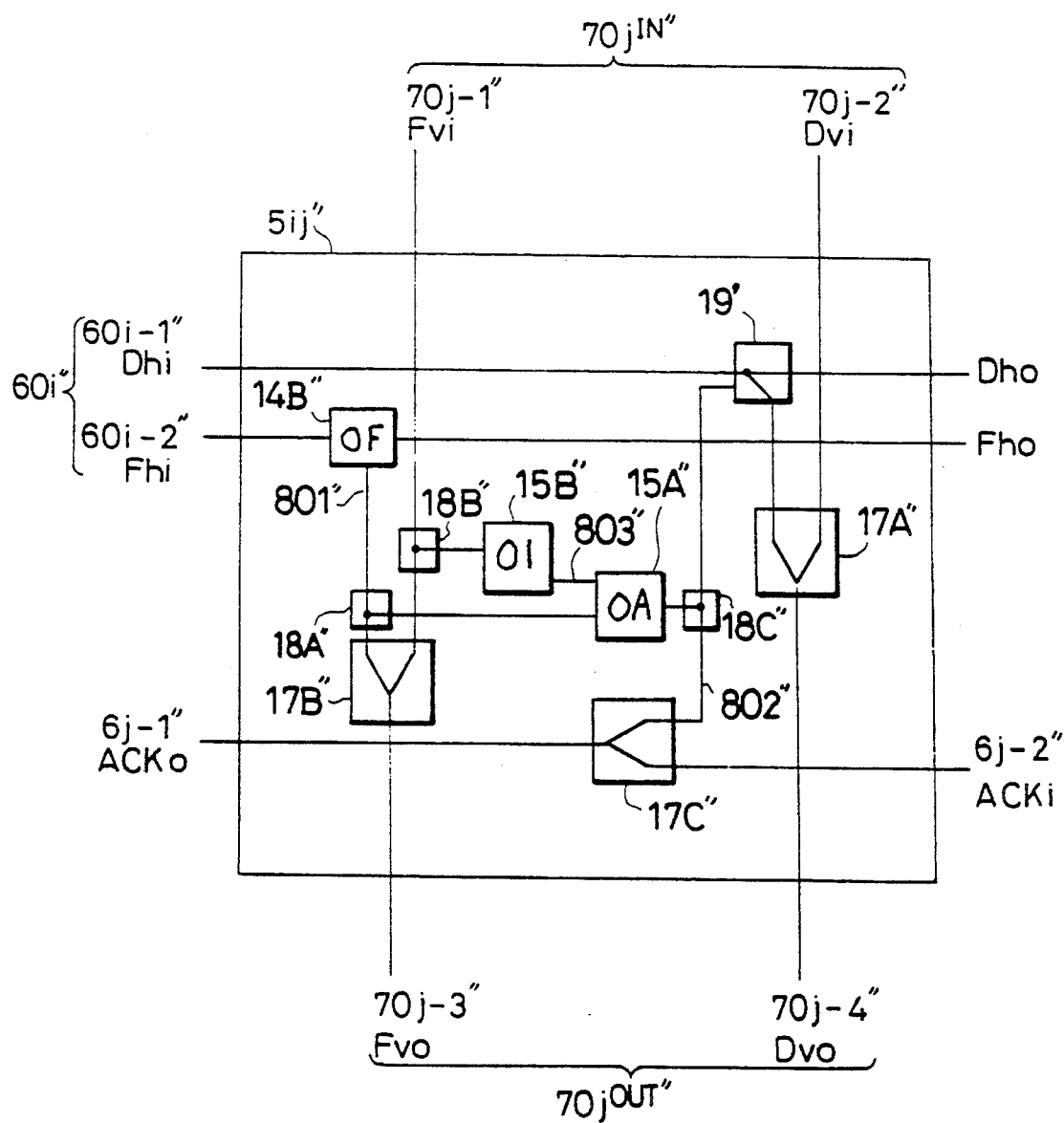
FIG. 21 is a detailed circuit diagram for an exemlary configuration of an optical crosspoint in the fourth embodiment of the present invention.

The optical crosspoint 5*ij*" has a configuration as shown in FIG. 21, which is in correspondence to the configuration of FIG. 12 described above for the first embodiment.

Namely, this optical crosspoint 5*ij*" of FIG. 21 comprises: an optical filter (OF) 14B" for outputting the optical frame signal on the optical frame signal line 60*i*-2" as an output signal 801" only when the wavelength of this optical frame signal is within a prescribed range representing the prescribed address to which this optical crosspoint 5*ij*" can be connected through the optical output line 70*j*" and which are specified for this optical crosspoint 5*ij*" in advance; an optical inverter (OI) 15B" for inverting the optical power of the optical frame signal split from the optical frame signal line 70*j*-1" by an optical splitter 18B" and outputting an output 803"; an optical AND gate (OA) 15A" having the output signal 801" of the optical filter 14B" split by an optical splitter 18A" and an output 803" of the optical inverter 15B" as its inputs, and outputting a control signal 802" in a high level when both of its outputs are in high levels; a photonic switch 19" for outputting the optical cell in the optical cell data line 60*i*-1" to the optical cell data line 70*j*-4" of the outgoing optical output line 70*j*$^{OUT}$ when the control signal 802" from the optical AND gate 15A" split by an optical splitter 18C" is in a high level, or passing it further on the optical cell data line 60*i*-1" to the outgoing side otherwise; an optical OR gate 17A" having the output of the photonic switch 19" and the optical cell in the optical cell data line 70*j*-2" of the incoming optical output line 70*j*$^{IN"}$ as its inputs and outputting the optical cell in the optical cell date line 70*j*-4" of the outgoing optical output line 70*j*$^{OUT"}$; an optical OR gate 17B" having the output signal 801" of the optical filter 14B" and the optical frame signal in the optical frame signal line 70*j*-1" of the incoming optical output line 70*j*$^{IN"}$ as its inputs and outputting the optical frame signal in the optical frame signal line 70*j*-3" of the outgoing optical output line 70*j*$^{OUT"}$; and an optical OR gate 17C" having the output 802" of the optical AND gate 15A" and the optical acknowledge signal ACK entering from the incoming optical acknowledge line 6*i*-2" as its inputs and outputting the optical acknowledge signal ACK to the outgoing optical acknowledge line 6*i*-1".

Thus, this optical crosspoint 5*ij*" can realize the optical self-routing function in which the optical cell arriving from an upper stream side of the optical output line is passed to a lower stream side of the optical output line with a higher priority than the optical cell arriving from the optical input line, and the optical cell arriving from the optical input line is outputted to the lower stream side of the optical output line only when there is no optical cell arriving from the upper stream side of the optical output line.

Figure 22:
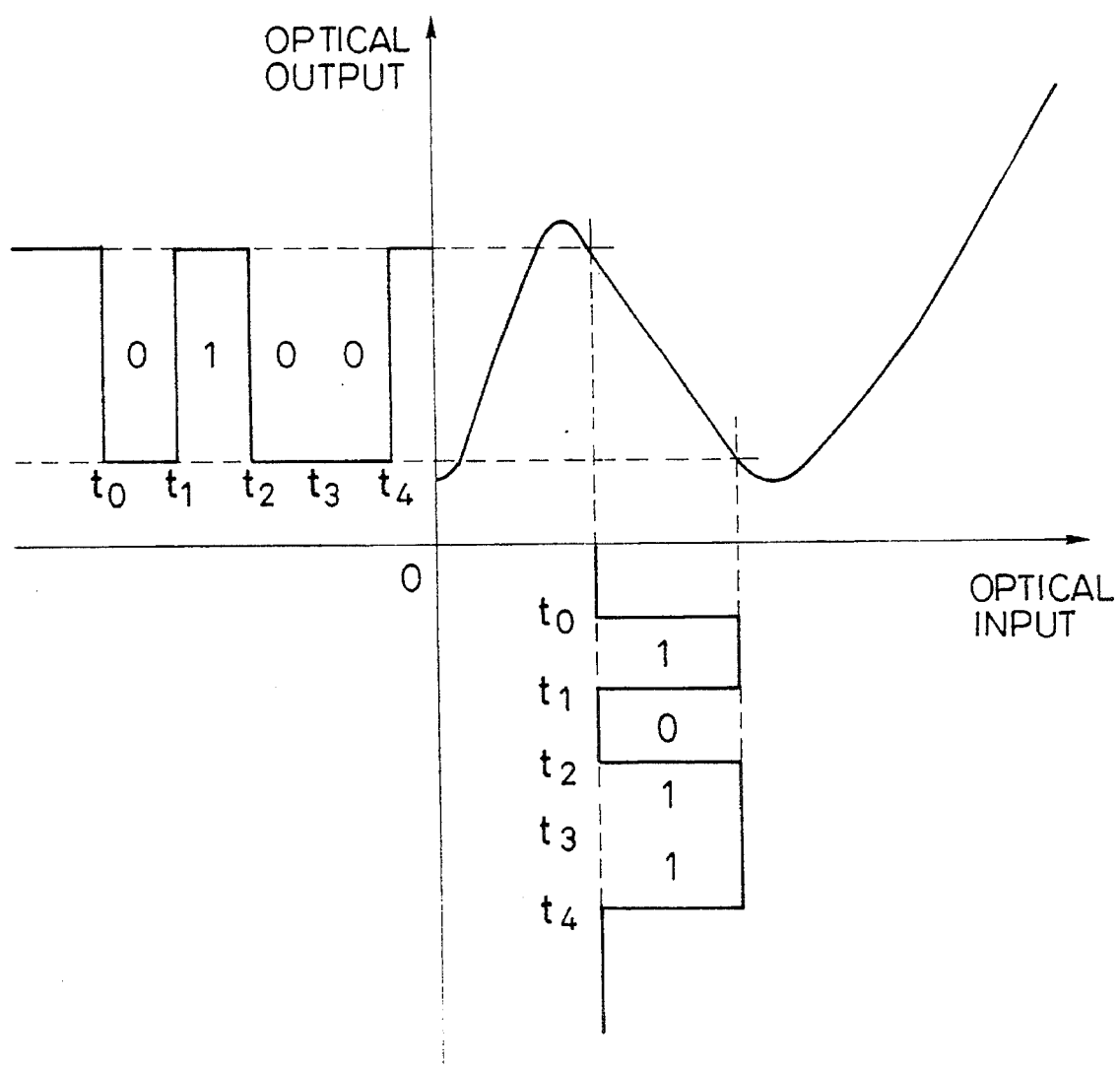
FIG. 22 is an operation characteristic of an optical inverter in the optical crosspoint of FIG. 21.
Figure 23:
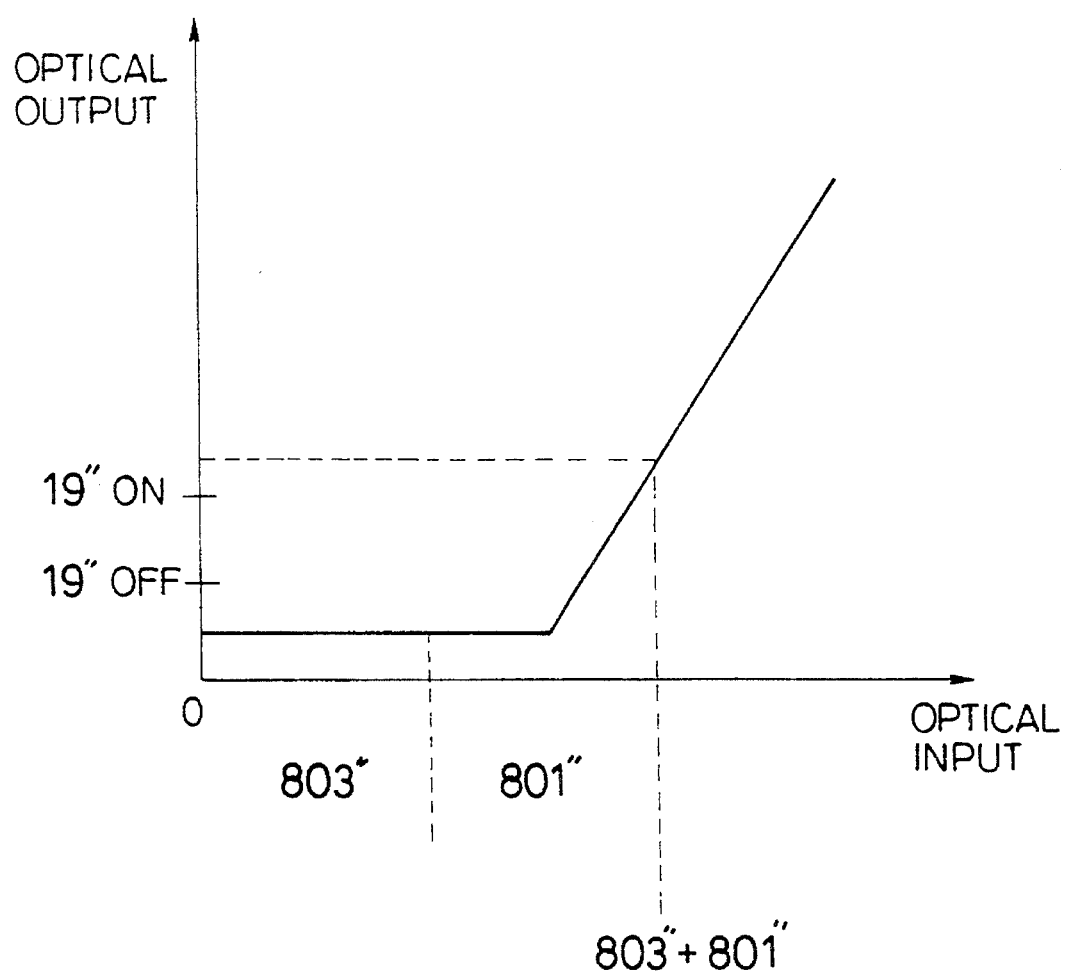
FIG. 23 is an operation characteristic of an optical AND gate in the optical crosspoint of FIG. 21.

In this configuration of FIG. 21, the optical inverter 15B" can be realized by a twin-stripe type semiconductor laser having a nonlinear operation characteristic shown in FIG. 22. The optical AND gate 15A" can be realized by a laser diode with a propagation waveform having an operation characteristic as shown in FIG. 23. Each of the optical OR gates 17A", 17B", and 17C" can be realized by a twin-stripe type semiconductor laser having an operation characteristic shown in FIG. 24. Each of the optical splitters 18A", 18B", and 18C" can be realized by a 3 dB coupler. The photonic switch 19" can be realized by a nonlinear element utilizing the Kerr effect.

It is also possible to use this optical crosspoint 5*ij*" along with the input buffers 30*i* for handling the cells and the frame signals as electric signals, by attaching photoelectric conversion elements on the input lines 60*i* of the matrix type switch.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An ATM switch For switching cells from N input transmission lines to M output transmission lines, where N and M are integers, comprising:

N input buffers for temporarily storing cells arriving from said N input transmission lines;

M output buffers for temporarily storing cells to be outputted to said M output transmission lines; and a matrix type switch formed by N input lines for transmitting the cells read out from the input buffers, M output lines for transmitting the cells to be written into the output buffers, and N×M crosspoints located at intersections of the input lines and the output lines, where each crosspoint at an intersection of one input line and one output line carries out an arbitration operation in which a cell arriving from an upper stream side of said one output line is passed to a lower stream side of said one output line with a higher priority than a cell arriving from said one input line, and the cell arriving from said one input line is transferred to the lower stream side of said one output line only when there is no cell arriving from the upper stream side of said one output line.

2. The ATM switch of claim 1, wherein said each crosspoint returns an acknowledge signal to one input buffer connected with said one input line when the cell arriving from said one input line is transferred to the lower stream side of said one output line.

3. The ATM switch of claim 2, wherein a reading speed of the input buffers and a writing speed of the output buffers are m times faster than a writing speed of the input buffers, where m is an integer and 1<m<N, such that said one input buffer repetitively reads out the cell to said one input line, up to m times at most within each input cell period by which the cells are written into the input buffers, until the acknowledge signal is returned from said each crosspoint.

4. The ATM switch of claim 1, wherein a cell read out operation of each input buffer is limited such that only one cell read out from said each input buffer is transferred to the output buffers within one input cell period by which the cells are written into the input buffers.

5. The ATM switch of claim 1, wherein each input buffer measures an actual queue length within itself and discards an earliest stored cell among currently stored cells when the actual queue length exceeds a prescribed threshold queue length.

6. The ATM switch of claim 1, wherein each crosspoint further comprises:

selector means for selectively outputting one of the cell arriving from said one input line and the cell arriving from the upper stream side of said one output line to the lower stream side of said one output line;

address filter means for outputting an output signal indicating whether the cell arriving from said one input line has an output destination address coinciding with a prescribed destination address specified for said each crosspoint; and arbitration circuit means for generating a selector control signal for controlling a selection operation of the selector means according to the output signal of the address filter means and a frame signal for the cell arriving from the upper stream side of said one output line.

7. The ATM switch of claim 6, wherein the arbitration circuit means further comprises:

AND gate means for outputting a product of the output signal of the address filter means and a negation of the frame signal for the cell arriving from the upper stream side of said one output line; and latch means for outputting the selector control signal to the selector means according to the product outputted by the AND gate means.

8. The ATM switch of claim 7, wherein the latch means has an S terminal for receiving the product outputted by the AND gate means, and an R terminal for receiving one of a frame signal for the cell arriving from said one input line and an externally supplied input cell period by which the cells are written into the input buffers.

9. The ATM switch of claim 6, wherein the arbitration circuit means also outputs the selector control signal to one input buffer connected with said one input line as an acknowledge signal when the cell arriving from said one input line is transferred to the lower stream side of said one output line.

10. The ATM switch of claim 1, wherein each crosspoint further comprises:

address filter means for outputting an output signal indicating whether the cell arriving from said one input line has an output destination address coinciding with a prescribed destination address specified for said each crosspoint;

first AND gate means for outputting a product of the output signal of the address filter means and a negation of the frame signal for the cell arriving from the upper stream side of said one output line;

second AND gate means for outputting a product of the cell arriving from said one input line and the product outputted by the first AND gate means;

first OR gate means for outputting one of the product outputted by the second AND gate means and the cell arriving from the upper stream side of said one output line, to the lower stream side of said one output line;

second OR gate means for outputting one of the output signal of the address filter means and the frame signal for the cell arriving from the upper stream side of said one output line, to the lower stream side of said one output line; and third OR gate means for outputting one of the product outputted by the first AND gate means and an acknowledge signal arriving from an adjacent crosspoint, as the acknowledge signal to be returned to one input buffer connected with said one input line.

11. The ATM switch of claim 1, wherein each output buffer is connected with one output line such that a jj-th crosspoint at an intersection of a j-th input line and a j-th output line among the crosspoints located on said one output line is set to be a most upper stream side crosspoint, where j is an integer and $1 \leq j \leq N$, $1 \leq j \leq M$.

12. The ATM switch of claim 1, wherein the crosspoints forming the matrix type switch are optical crosspoints.

13. The ATM switch of claim 12, wherein each optical crosspoint further comprises:

optical filter means for outputting an output signal indicating whether a wavelength of a frame signal for the cell arriving from said one input line is within a prescribed range specified for said each optical crosspoint;

optical AND fate means for outputting a product of the output signal of the optical filter means and a negation of the frame signal for the cell arriving from the upper stream side of said one output line;

photonic switch means for changing a propagation direction of the cell arriving from said one input line according to the product outputted by the optical AND gate means;

first optical OR gate means for outputting one of the cell arriving from said one input line whose propagation direction is changed by the photonic switch means and the cell arriving from the upper stream side of said one output line, to the lower stream side of said one output line;

second optical OR gate means for outputting one of the output signal of the optical filter means and the frame signal for the cell arriving from the upper stream side of said one output line, to the lower stream side of said one output line; and third optical OR gate means for outputting one of the product outputted by the optical AND gate means and an acknowledge signal arriving from an adjacent crosspoint, as the acknowledge signal to be returned to one input buffer connected with said one input line.

14. A method of ATM switching operation for switching cells from N input transmission lines to M output transmission lines, where N and M are integers, comprising the steps of:

forming a matrix type switch by N input lines for transmitting the cells read out from N input buffers for temporarily storing cells arriving from said N input transmission lines, M output lines for transmitting the cells to be written into M output buffers for temporarily storing cells to be outputted to said M output transmission lines, and N×M crosspoints located at intersections of the input lines and the output lines; and carrying out an arbitration operation at each crosspoint at an intersection of one input line and one output line, in which a cell arriving from an upper stream side of said one output line is passed to a lower stream side of said one output line with a higher priority than a cell arriving from said one input line, and the cell arriving from said one input line is transferred to the lower stream side of said one output line only when there is no cell arriving from the upper stream side of said one output line.

15. The method of claim 14, further comprising the step of returning an acknowledge signal from said each crosspoint to one input buffer connected with said one input line when the cell arriving from said one input line is transferred to the lower stream side of said one output line.

16. The method of claim 15, wherein a reading speed of the input buffers and a writing speed of the output buffers are set to be m times faster than a writing speed of the input buffers at the forming step, where m is an integer and $1 < m < N$, and further comprising the step of operating said one input buffer to repetitively read out the cell to said one input line, up to m times at most within each input cell period by which the cells are written into the input buffers, until the acknowledge signal is returned from said each crosspoint at the returning step.

17. The method of claim 14, further comprising the step of operating each input buffer under a limitation that only one cell read out from said each input buffer is transferred to the output buffers within one input cell period by which the cells are written into the input buffers.

18. The method of claim 14, further comprising the step of measuring an actual queue length within each input buffer and discarding an earliest stored cell among currently stored cells when the actual queue length exceeds a prescribed threshold queue length.

19. The method of claim 14, wherein at the forming step, each output buffer is connected with one output line such that a jj-th crosspoint at an intersection of of a j-th input line and a J-th output line among the crosspoints located on said one output line is set to be a most upper stream side crosspoint, where j is an integer and $1 \leq j \leq N$, $1 \leq j \leq M$.

20. An ATM switch for switching cells from N input transmission lines to M output transmission lines, where N and M are integers, comprising:

N input buffers for temporarily storing cells arriving from said N input transmission lines;

M output buffers for temporarily storing cells to be outputted to said M output transmission lines;

a matrix type switch formed by N input lines for transmitting the cells read out from the input buffers, M output lines for transmitting the cells to be written into the output buffers, and N×M crosspoints located at intersections of the input lines and the output lines, where each output buffer is connected with one output line such that a jj-th crosspoint at an intersection of of a j-th input line and a j-th output line is set to be a most upper stream side crosspoint among the crosspoints located on said one output line, where j is an integer and $1 \leq j \leq N$, $1 \leq j \leq M$.

21. The ATM switch of claim 20, wherein each crosspoint at an intersection of one input line and one output line carries out an arbitration operation in which a cell arriving from an upper stream side of said one output line is passed to a lower stream side of said one output line with a higher priority than a cell arriving from said one input line, and the cell arriving from said one input line is transferred to the lower stream side of said one output line only when there is no cell arriving from the upper stream side of said one output line.

22. The ATM switch of claim 20, wherein each crosspoint at an intersection of one input line and one output line carries out an arbitration operation in which a cell arriving from said one input line is transferred to a lower stream side of said one output line with a higher priority than a cell arriving from an upper stream side of said one output line, and the cell arriving from the upper stream side of said one output line is passed to the lower stream side of said one output line only when there is no cell arriving from said input line.

* * * * *